US011579987B1

(12) United States Patent
Shats et al.

(10) Patent No.: US 11,579,987 B1
(45) Date of Patent: Feb. 14, 2023

(54) DISASTER RECOVERY SYSTEMS AND METHODS WITH LOW RECOVERY POINT OBJECTIVES

(71) Applicant: Jetstream Software Inc., San Jose, CA (US)

(72) Inventors: Serge Shats, Palo Alto, CA (US); Alexei Jelvis, Menlo Park, CA (US)

(73) Assignee: Jetstream Software Inc., San Jose, CA (US)

( * ) Notice: Subject to any disclaimer, the term of this patent is extended or adjusted under 35 U.S.C. 154(b) by 0 days.

(21) Appl. No.: 17/316,518

(22) Filed: May 10, 2021

Related U.S. Application Data

(63) Continuation of application No. 16/721,799, filed on Dec. 19, 2019, now Pat. No. 11,036,594.

(Continued)

(51) Int. Cl.
*G06F 11/00* (2006.01)
*G06F 11/14* (2006.01)
(Continued)

(52) U.S. Cl.
CPC ...... *G06F 11/1469* (2013.01); *G06F 9/45558* (2013.01); *G06F 11/1435* (2013.01); *G06F 11/1451* (2013.01); *G06F 11/1461* (2013.01); *G06F 11/1464* (2013.01); *G06F 11/1471* (2013.01); *G06F 11/1484* (2013.01);
(Continued)

(58) Field of Classification Search
CPC ............. G06F 11/1469; G06F 11/1435; G06F 11/1451; G06F 11/1461; G06F 11/1464; G06F 11/1471; G06F 11/1484
See application file for complete search history.

(56) References Cited

U.S. PATENT DOCUMENTS 5,809,527 A 9/1998 Cooper et al.
5,832,515 A 11/1998 Ledain et al.
(Continued)

FOREIGN PATENT DOCUMENTS

WO WO 2021/016230 A1 1/2021

OTHER PUBLICATIONS

PCT/US2020/042858 International Search Report and Written Opinion dated Nov. 11, 2020.
(Continued)

*Primary Examiner* — Philip Guyton
(74) *Attorney, Agent, or Firm* — Alston & Bird LLP

(57) ABSTRACT

Data recovery systems and methods utilize object-based storage for providing a data protection and recovery methodology with low recovery point objectives, and for enabling both full recovery and point-in-time based recovery. Data generated at a protected site (e.g., via one or more virtual machines) is intercepted during write procedures to primary storage. The intercepted data is replicated via a replication log, provided as data objects, and transmitted to an object based storage system. During recovery, data objects may be retrieved through point-in-time based recovery directly by the systems of the protected site, and/or data objects may be provided via full recovery, for example, within a runtime environment of a recovery site, with minimal data loss and operation interruption by rehydrating data objects within the runtime environment via low-latency data transfer and rehydration systems.

17 Claims, 12 Drawing Sheets

Related U.S. Application Data

(60) Provisional application No. 62/878,661, filed on Jul. 25, 2019.

(51) Int. Cl.
     *G06F 16/18*     (2019.01)
     *G06F 12/02*     (2006.01)
     *G06F 9/455*     (2018.01)

(52) U.S. Cl.
     CPC ...... *G06F 12/0253* (2013.01); *G06F 16/1873* (2019.01); *G06F 2009/45587* (2013.01); *G06F 2009/45591* (2013.01); *G06F 2009/45595* (2013.01)

(56) References Cited

U.S. PATENT DOCUMENTS

| | | | |
|---|---|---|---|
| 5,963,983 | A | 10/1999 | Sakakura et al. |
| 6,014,724 | A | 1/2000 | Jenett |
| 6,209,058 | B1 | 3/2001 | Shats et al. |
| 6,490,651 | B1 | 12/2002 | Shats et al. |
| 6,535,949 | B1 | 3/2003 | Parker |
| 6,553,401 | B1 | 4/2003 | Carter et al. |
| 6,609,177 | B1 | 8/2003 | Schlumberger et al. |
| 6,865,650 | B1 | 3/2005 | Morley et al. |
| 7,577,783 | B2 | 8/2009 | Hsu |
| 7,984,259 | B1 | 7/2011 | English |
| 8,621,145 | B1 | 12/2013 | Kimmel et al. |
| 9,323,659 | B2 | 4/2016 | Shats et al. |
| 9,563,517 | B1 | 2/2017 | Natanzon et al. |
| 11,036,594 | B1 * | 6/2021 | Shats ................ G06F 11/1435 |
| 2002/0091814 | A1 | 7/2002 | Arendt et al. |
| 2003/0217033 | A1 | 11/2003 | Sandler et al. |
| 2007/0033356 | A1 | 2/2007 | Erlikhman |
| 2007/0198796 | A1 | 8/2007 | Warren, Jr. |
| 2008/0147974 | A1 | 6/2008 | Madison et al. |
| 2008/0162795 | A1 | 7/2008 | Hsieh |
| 2008/0189485 | A1 | 8/2008 | Jung et al. |
| 2009/0031083 | A1 | 1/2009 | Willis et al. |
| 2009/0037646 | A1 | 2/2009 | Molotchko et al. |
| 2009/0150599 | A1 | 6/2009 | Bennett |
| 2009/0210631 | A1 | 8/2009 | Bosworth et al. |
| 2010/0036872 | A1 * | 2/2010 | Hiraiwa ................ G06F 16/164 707/E17.055 |
| 2010/0049718 | A1 | 2/2010 | Aronovich et al. |
| 2010/0070729 | A1 | 3/2010 | Ng et al. |
| 2010/0077197 | A1 | 3/2010 | Ergan et al. |
| 2010/0153617 | A1 | 6/2010 | Miroshnichenko et al. |
| 2010/0174846 | A1 | 7/2010 | Paley et al. |
| 2010/0174847 | A1 | 7/2010 | Paley et al. |
| 2010/0191897 | A1 | 7/2010 | Zhang et al. |
| 2010/0199042 | A1 | 8/2010 | Bates et al. |
| 2010/0205367 | A1 | 8/2010 | Ehrlich et al. |
| 2011/0022801 | A1 | 1/2011 | Flynn |
| 2011/0047317 | A1 | 2/2011 | Burkard et al. |
| 2011/0066808 | A1 | 3/2011 | Flynn et al. |
| 2011/0153912 | A1 | 6/2011 | Gorobets et al. |
| 2011/0153913 | A1 | 6/2011 | Huang et al. |
| 2011/0191522 | A1 | 8/2011 | Condict et al. |
| 2012/0066760 | A1 | 3/2012 | Anderson et al. |
| 2012/0239869 | A1 | 9/2012 | Chiueh et al. |
| 2016/0342486 | A1 * | 11/2016 | Kedem ................ G06F 11/1471 |
| 2017/0083412 | A1 | 3/2017 | Mamluk et al. |
| 2018/0356989 | A1 | 12/2018 | Meister et al. |
| 2019/0065093 | A1 | 2/2019 | Karr et al. |
| 2019/0213123 | A1 | 9/2019 | Agarwal |

OTHER PUBLICATIONS

U.S. Appl. No. 16/721,799 Non-Final Office Action dated May 12, 2020.
U.S. Appl. No. 16/721,799 Final Office Action dated Sep. 22, 2020.
U.S. Appl. No. 16/721,799 Non-Final Office Action dated Jan. 15, 2021.

* cited by examiner

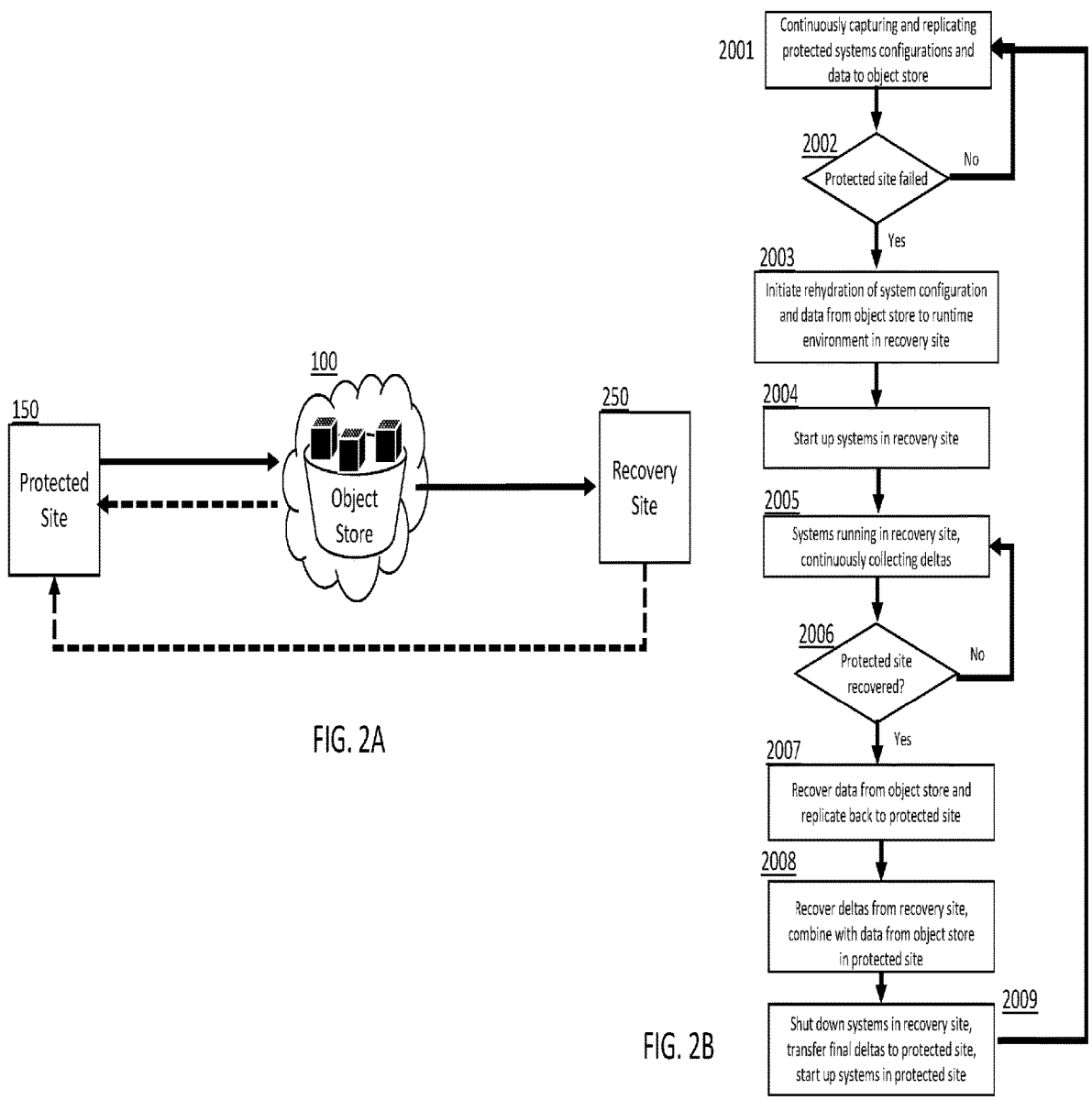

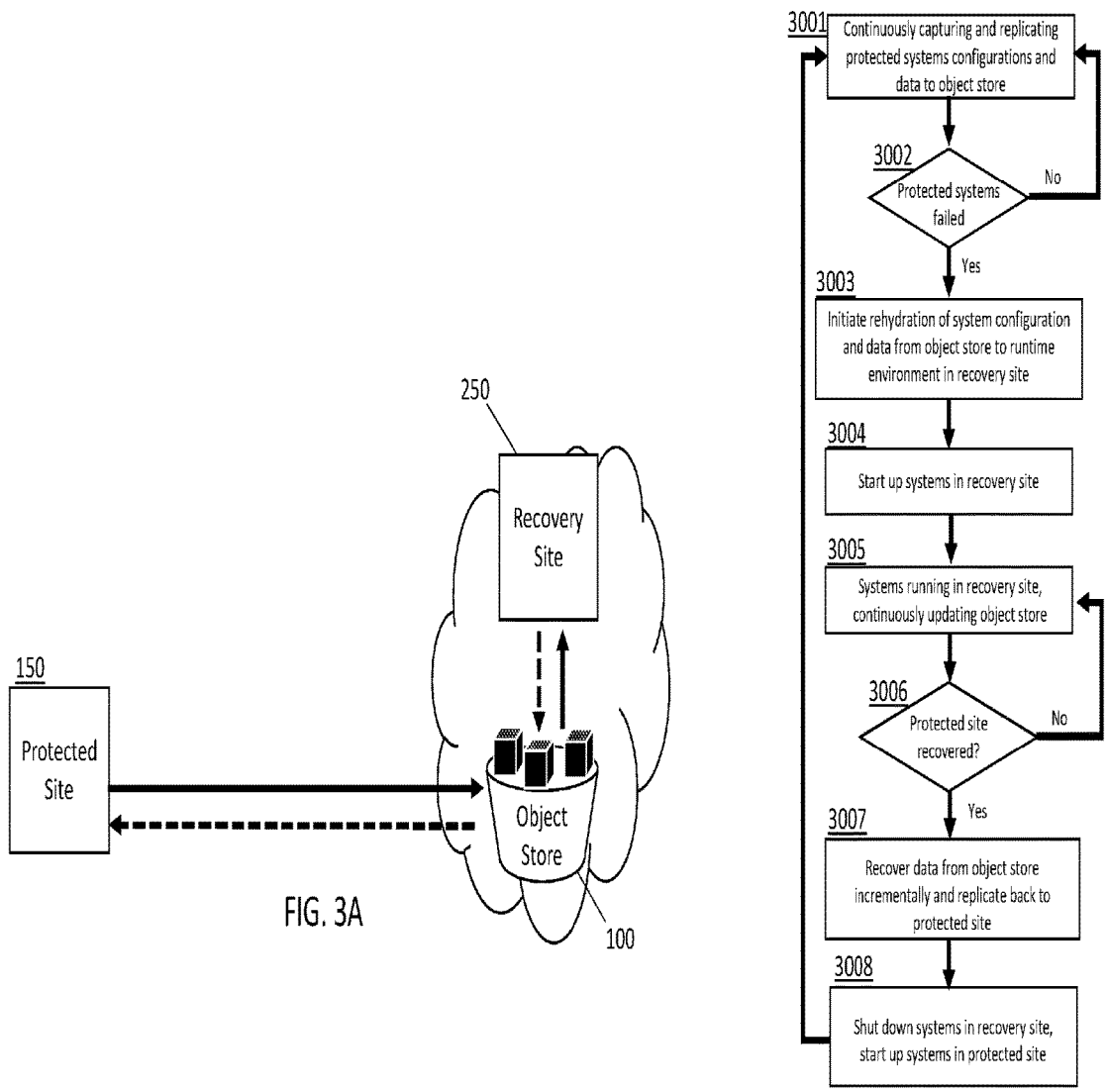

DISASTER RECOVERY SYSTEMS AND METHODS WITH LOW RECOVERY POINT OBJECTIVES

CROSS-REFERENCE TO RELATED APPLICATIONS

This patent application is a continuation of U.S. patent application Ser. No. 16/721,799, filed Dec. 19, 2019, which claims priority from U.S. Provisional Patent Appl. Ser. No. 62/878,661, filed Jul. 25, 2019, all of which are incorporated herein by reference in their entirety.

BACKGROUND

Field of the Invention

Various embodiments pertain to software and hardware for data protection and recovery. More specifically, various embodiments pertain to software and hardware enabling continuous data protection with data maintained in an object store.

Description of Related Art

Cloud-based object storage is often used for storing snapshot files for data backup. In order to achieve lower recovery point objectives (RPO), systems for continuous data protection (CDP) generally do not use snapshots. Frequent snapshots negatively impact overall application performance and storage space utilization. Incremental snapshot methods typically employ changed block tracking (CBT) processes and re-read data, creating additional processing overhead on the protected systems' primary storage resources. Finally, full recovery of system data from multiple incremental snapshots is compute-intensive and time consuming.

BRIEF SUMMARY

Various embodiments discussed herein enable methods in which data is captured in real-time and replicated (e.g., continuously) to a recovery environment that systems can fail over to in the event of an operational interruption in the primary (protected) environment. The continuously replicated data may be maintained in the recovery environment in an object store or in a filesystem storage resource for immediate system and data recovery. The primary challenge for providers of Disaster Recovery (DR) services is to achieve economies of scale through multi-tenant services in which runtime resources (compute, storage, network, etc.) are provisioned only as needed, when a specific customer has an incident requiring "failover" to the service provider's infrastructure. Object storage presents a means for efficient, low-cost data storage for multiple tenants. However, object storage technology has not been associated with currently available CDP systems, due to the challenges of populating the object store on a continuous basis, and the fact that operational systems cannot fail over to an object store; rather a filesystem-based runtime environment is required, and extraction of the systems and data from the object store to a runtime environment can be complex and time consuming.

Various embodiments are directed to object-based recovery storage systems and methods for storing systems, data, and configuration information of a protected site, thereby enabling recovery of the systems and their data via any of a variety of recovery mechanisms, including point-in-time recovery, version-based recovery, and/or full-recovery of systems. Utilizing object-based recovery storage systems in accordance with various embodiments provide low recovery point objectives during transitions between a protected site and a recovery site.

Certain embodiments are directed to a data recovery system for protecting data generated and stored in primary storage in association with a protected site. In certain embodiments, the data recovery system comprises: an object-based data store for storing data of one or more protected sites for recovery, wherein the object-based data store comprises one or more non-transitory memory storage areas and one or more processors and wherein the object-based data store is configured to: receive data replicated from the one or more protected sites while the data is written to primary storage of the one or more protected sites in real time; store the data received from the one or more protected sites in object-based storage within the one or more non-transitory memory storage areas together with corresponding metadata uniquely identifying each data object to enable point-in-time recovery; store base data objects corresponding to at least one of the one or more protected sites in the object-based storage within the one or more non-transitory memory storage areas to enable full recovery of systems associated with the at least one of the one or more protected sites; and provide one or more data objects to a recovery site or one of the one or more protected sites to enable recovery of data associated with a protected site of the one or more protected sites.

In various embodiments, receiving data replicated from the one or more protected sites comprises receiving data from a replication log executing via a processing system of a protected site of the one or more protected sites. Moreover, the replication log of certain embodiments corresponds to a recovery group associated with a plurality of virtual machines executing at the protected site. Receiving data replicated from a replication log of certain embodiments comprises receiving data from the replication log via a protection domain corresponding with the replication log. In certain embodiments, storing base data objects comprises storing base data objects subject to garbage collection performed at the one or more protected sites based at least in part on data stored within primary storage of the one or more protected sites.

In various embodiments, the corresponding metadata uniquely identifying each data object to enable point-in-time recovery comprises metadata identifying a timestamp associated with each data object. Moreover, providing one or more data objects to a recovery site or one or more of the one or more protected sites may comprise rehydrating one or more data objects within an operating environment of a recovery site. In certain embodiments, the object-based data store is configured to store version base data objects corresponding to at least one of the one or more protected sites in the object-based storage within the one or more non-transitory memory storage areas to enable version-based recovery of systems associated with the at least one of the one or more protected sites.

Various embodiments are directed to a method for protecting data generated and stored in primary storage in association with a protected site and enabling data recovery, the method comprising: receiving data replicated from the one or more protected sites while the data is written to primary storage of one or more protected sites in real time; storing the data received from the one or more protected sites in object-based storage within one or more non-transitory memory storage areas together with corresponding metadata uniquely identifying each data object to enable point-in-time recovery; storing base data objects corresponding to at least one of the one or more protected sites in the object-based storage within the one or more non-transitory memory storage areas to enable full recovery of systems associated with the at least one of the one or more protected sites; and providing one or more data objects to a recovery site or one of the one or more protected sites to enable recovery of data associated with a protected site of the one or more protected sites.

In certain embodiments, receiving data replicated from the one or more protected sites comprises receiving data from a replication log executing via a processing system of a protected site of the one or more protected sites. Moreover, the replication log may correspond to a recovery group associated with a plurality of virtual machines executing at the protected site. In various embodiments, receiving data replicated from a replication log comprises receiving data from the replication log via a protection domain corresponding with the replication log. In certain embodiments, storing base data objects comprises storing base data objects subject to garbage collection performed at the one or more protected sites based at least in part on data stored within primary storage of the one or more protected sites. The corresponding metadata may uniquely identify each data object to enable point-in-time recovery that comprises metadata identifying a timestamp associated with each data object. In certain embodiments, providing one or more data objects to a recovery site or one or more of the one or more protected sites comprises rehydrating one or more data objects within an operating environment of a recovery site. In various embodiments, the method further comprises storing version base data objects corresponding to at least one of the one or more protected sites in the object-based storage within the one or more non-transitory memory storage areas to enable version-based recovery of systems associated with the at least one of the one or more protected sites.

Various embodiments are directed to a computer-program product for protecting data generated and stored in primary storage in association with a protected site and enabling data recovery, the computer-program product comprising at least one non-transitory computer-readable storage medium having computer-readable program code portions stored therein, the computer-readable program code portions comprising an executable portion configured to: receive data replicated from the one or more protected sites while the data is written to primary storage of the one or more protected sites in real time; store the data received from the one or more protected sites in object-based storage within one or more non-transitory memory storage areas together with corresponding metadata uniquely identifying each data object to enable point-in-time recovery; store base data objects corresponding to at least one of the one or more protected sites in the object-based storage within the one or more non-transitory memory storage areas to enable full recovery of systems associated with the at least one of the one or more protected sites; and provide one or more data objects to a recovery site or one of the one or more protected sites to enable recovery of data associated with a protected site of the one or more protected sites.

In various embodiments, receiving data replicated from the one or more protected sites comprises receiving data from a replication log executing via a processing system of a protected site of the one or more protected sites. In certain embodiments, the replication log corresponds to a recovery group associated with a plurality of virtual machines executing at the protected site. In various embodiments, receiving data replicated from a replication log comprises receiving data from the replication log via a protection domain corresponding with the replication log. In certain embodiments, storing base data objects comprises storing base data objects subject to garbage collection performed at the one or more protected sites based at least in part on data stored within primary storage of the one or more protected sites. Moreover, the corresponding metadata uniquely identifying each data object to enable point-in-time recovery comprises metadata identifying a timestamp associated with each data object. In certain embodiments, providing one or more data objects to a recovery site or one or more of the one or more protected sites comprises rehydrating one or more data objects within an operating environment of a recovery site. Moreover, the object-based data store may be configured to store version base data objects corresponding to at least one of the one or more protected sites in the object-based storage within the one or more non-transitory memory storage areas to enable version-based recovery of systems associated with the at least one of the one or more protected sites.

Various embodiments are directed to a method for protecting data generated and stored in primary storage in association with a protected site and enabling data recovery. The method may be performed by a system and/or a computer program product as discussed herein. In certain embodiments, the method comprises: intercepting, via an IO filter, data items for storage within a primary storage of a protected site; replicating the data items via a replication log; generating data objects comprising a plurality of data items; and transmitting the data objects to an object store for storage together with corresponding metadata uniquely identifying each data object to enable point-in-time recovery.

In certain embodiments, the method further comprises generating a snapshot of at least a portion of data within primary storage of a protected site during a recovery; after generating the snapshot, receiving one or more data objects from the object based storage; and rehydrating the one or more data objects for execution within the protected site. Moreover, the method may further comprise receiving, during a recovery, one or more data objects from the object based storage; rehydrating the one or more data objects for execution within the protected site; receiving, from a recovery site, one or more data elements generated during a failure period; and generating one or more new data objects comprising the one or more data elements generated during the failure period; and transmitting the one or more new data objects to the object store.

BRIEF DESCRIPTION OF THE SEVERAL VIEWS OF THE DRAWINGS

Reference will now be made to the accompanying drawings, which are not necessarily drawn to scale, and wherein:

FIGS. 2A-2B shows data replication to an object store, with systems failing over to a recovery site and, upon the restoration of the protected site, live "fail-back" of the systems to the protected site. The workflow diagram illustrates the process by which failover and fail-back occur, such that systems experience minimal downtime and remain protected continuously.

FIGS. 3A-3B shows data replication to an object store, with systems failing over to a recovery site co-located with the object store, and, upon the restoration of the protected site, live "fail-back" of the systems to the protected site. The workflow diagram illustrates the process by which failover and fail-back occur, such that systems experience minimal downtime and remain protected continuously through replication to the object store while they are running in the recovery site.

DETAILED DESCRIPTION

Figure 1:
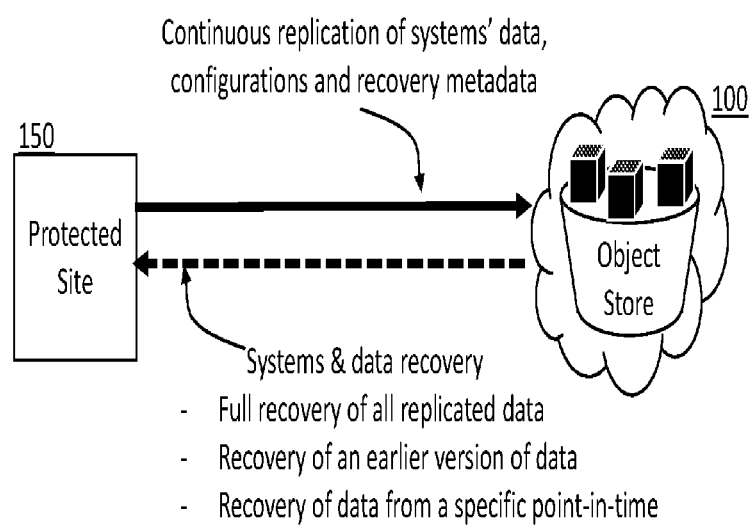
FIG. 1 shows replication of systems and data to an object store, for recovery back to the protected environment and resumption of operations. This is an example of an economical means of providing systems and data low-RPO protection when the systems do not require low-RTO failover and recovery.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

I. Overview

Various embodiments are directed to a data recovery system, such as an apparatus and/or a method of a software system that enables the continuous protection of a computing system of a protected site's configuration and data, as the data changes during the normal operation of the computing system, through a recovery service based on an object store platform. The software provides a mechanism for continuous data intercept within the data path to the primary storage resources in a primary (protected) computing environment, with replication to an object store in the secondary (recovery) environment. Additional features and capabilities of the software include data versioning, system failover for business continuity, periodic service testing, live fail-back and point-in-time recovery. Moreover, certain embodiments are configured for modifying (e.g., temporarily) various configuration information associated with certain systems (e.g., virtual machines) to maintain operability while those systems are operating within a recovery site, for example, after a hardware failure at a protected site.

The system employs software components optimized for use with persistent memory or any other low-latency storage resources to reduce negative impact on application performance as data is intercepted in the primary site and recorded in intermediate logs for asynchronous writing into primary storage and replication to the recovery site.

Certain embodiments are directed to a method of using object storage for computing system recovery in a multi-tenant manner, with data isolation and shared recovery site resources. A single object store concurrently maintains copies of systems, data, and configuration information from multiple protected sites, each of which continuously replicates data to the object store. Dedicated compute, storage and network resources at the recovery site are allocated to recover operations for protected sites only when needed to resume operations for a protected site, usually due to operational disruption at the protected site. For example, dedicated compute, storage, and network resources available for operation of the systems recovered from the object storage recovery system may be insufficient to support recovery of every protected site simultaneously.

Various embodiments address protection and recovery of virtualized computing environments, in which compute and storage operations are abstracted from systems and firmware through use of a software hypervisor, such that the protected entities are virtual machines (VMs) and virtual disks. However, the same methods can be applied to protect environments that are not virtualized and it should be understood that the protected system may be a virtual machine, a containerized application, or other software system that generates and stores data. With respect to virtualized environments, the method described comprises intercepting data through a data input-output filter, commonly referred to as an "TO filter," running in the data path within a virtual machine as the data is written to storage, and also callback notifications about events related to data input-output operations such as virtual disk open, virtual disk close, virtual machine snapshots, virtual machine movement to a different host server, etc.

Other methods of intercepting data for replication may be utilized with various embodiments, including but not limited to: application-specific agents including but not limited to software mechanisms for data redundancy and operational high availability, mechanisms for data redundancy among storage devices within dedicated storage systems, or data redundancy mechanisms within converged systems software that integrates compute and storage operationally and/or physically. In the description that follows, the mechanism described as an IO filter should be understood to include any software mechanism capable of capturing data as it is generated in the protected environment for replication to a recovery environment.

The software supports a number of use cases, including but not limited to:

a. Data replication to an object store, for recovery back to the protected environment and resumption of computing operations;
b. Data replication to an object store, for recovery to a different environment and resumption of computing operations in the different environment, in the event that operations cannot be resumed in a timely manner at the original protected environment.
c. Data replication to an object store for recovery into an available computing environment, for resumption of operations in the recovery environment, and subsequent resumption of operations at the original protected environment.
d. Data replication directly to a filesystem storage environment that can be accessed immediately by systems for data input-output operations by a computing operating system or hypervisor.

These use cases are described in greater detail below.

II. General Functionality

FIG. 1 illustrates functionality of systems and/or methods (e.g., which may be embodied as software in certain embodiments) configured for protection of one or more protected site's 150 systems' data and configuration information through replication to an object store 100 (e.g., continuous replication to an object store 100), and enabling recovery of the protected systems (of the protected site 150) and their data for resumption of operations in the original protected site 150. As discussed herein, systems of a protected site 150 may encompass virtual machines, operating systems executing on those virtual machines, software applications executing on those virtual machines, and/or the like. Data of the protected sites 150 may encompass anything stored in the data storage mechanisms (e.g., virtual disks) associated with the protected systems (e.g., virtual machines) associated with the protected site 150. Configuration information, as discussed herein, is utilized by one or more systems of a protected site 150 to enable successful operation of those systems, for example, within a new environment (e.g., an environment of a recovery site, as discussed herein). For example, the configuration information may comprise data indicative of resources each system (e.g., virtual machine) is assigned, such as processing resources, memory resources, and/or the like. The configuration information may additionally comprise data unique to a particular system (e.g., virtual machine) of a protected site 150, such as one or more hostnames, IP addresses, MAC addresses, access controls, and/or the like. Moreover, in certain embodiments the configuration information may be specific to a particular operating environment (e.g., when operating a virtual machine within a specific protected system), and accordingly various embodiments may be configured for automatic reconfiguration of configuration information to enable seamless operation of systems during recovery operations and/or to facilitate manual adjustment of configuration information in certain embodiments, as needed. The software supports various methods of recovery and restoration of operations, including, for example, the full recovery of the protected systems and all replicated data. For example, various embodiments enable recovery from systems failures and loss of data from systems in the protected environment of the protected site 150. Moreover, to enable a seamless (or near seamless) transition to a recovery site (e.g., after a hardware failure at a protected site 150), various embodiments enable automatic modification of at least a portion of configuration information (e.g., network settings, MAC address, and/or the like) associated with a system (e.g., a virtual machine) so as to enable operation within a recovery system in accordance with certain embodiments.

As shown in FIG. 1, data, configurations, recovery metadata, and/or the like is written to the object store 100 during operation of the protected site 150. As discussed herein, the protected site 150 may be operating virtual machines and their data may be intercepted during operation of the virtual machines via IO filters and transmitted to the object store 100 for storage (enabling recovery of the stored data, systems and their configuration information if needed) during operation of the protected site 150, although other configurations may be implemented in certain embodiments as well. Utilizing an IO filter to intercept data from a virtual machine of a protected site 150 for storage enables at least substantially continuous and real-time capture and storage of data generated at the protected site 150. Moreover, as illustrated in FIG. 1, the object store is configured to provide data back to the protected site 150, for example, during a recovery operation. The object store 100 may be configured to provide data back to the protected site 150 as a full recovery of all data replicated to the object store 100, recovery to an earlier version of data replicated to the object store 100, recovery of data from a specific point-in-time as reflected in the object store 100, and/or the like.

Certain embodiments of the data recovery system may be configured for enabling software of a protected site 150 to be reverted to earlier versions of the protected systems' data, for example, utilizing version-based data objects stored within the object data store. For example, various embodiments enable recovery of data lost due to accidental data corruption and/or destruction in the systems' current state. Certain embodiments are configured to generate multiple sequential versions of recovery data during the normal course of continuous data replication for data protection. Each version is crash-consistent and/or application-consistent with an earlier state of its corresponding protected system of the protected site 150.

Moreover, various embodiments of the data recovery system enable the recovery of the protected site's 150 systems and their data from a specific point-in-time. Point-in-time recovery can be used for recovery after a severe software failure (e.g., data corruption or a virus infection). In this case full recovery would not resolve the problem, as a full data recovery would also recover the corrupted data, virus or other software/data flaw. The suggested point in time for recovery can be selected by a user, for example via a user interface (or command line interface) enabling the alternative selection of a variety of recovery points. For example, the system enables movement forward and/or backward through the sequential recovery data. Such embodiments provide for recovery from data corruption or contamination of the protected environment of the protected site 150 by unwanted software or processes, such as computer viruses, malware or ransomware. For example, a user may determine a selectable recovery point at which a protected system and its respective data does not include an unwanted software or process (e.g., a software state existing prior to the generation, initiation, and/or installation of the undesirable software). Moreover, a user may optionally test multiple recovery points, so as to identify a recovery point characterized by minimal data loss (e.g., a latest-in-time recovery point) existing prior to the generation/initiation/installation of the undesirable software and/or process.

FIGS. 2A-2B illustrate functionality of data recovery systems and/or methods (e.g., which may be embodied as software in certain embodiments) configured for replication of protected site 150 systems' data and configuration information to an object store 100, with recovery of the systems and their data, with resumption of operations in an environment other than the original protected site (e.g., at a recovery site 250). In certain embodiments, capture and continuous replication of data from the protected site 150 to the object store 100 may proceed in a manner as discussed in reference to FIG. 1, above. For example, as reflected at Block 2001 of FIG. 2B, data from the protected site 150 may be continuously captured and replicated to the object store 100 of the data recovery system. Such embodiments provide a method for maintaining business continuity by resuming operations as quickly as possible (e.g., with minimal data interruption) upon detection of a failure of the protected site 150 (as reflected at Block 2002), even if resuming operations at the original protected site 150 is not possible for some period of time, such as during a fire, flood or other natural disaster or a severe hardware failure. In accordance with certain embodiments, a failure of a protected system 150 (e.g., a hardware failure and/or a software failure) may be detected programmatically, for example, by one or more computing entities (e.g., associated with the object store) detecting one or more error messages, detecting a failure to receive a "ping" response, detecting a failure to receive an expected heartbeat signal, and/or the like. In other embodiments, a failure may be detected based at least in part on user input identifying the occurrence of a failure. Similarly, trigger events for initiating a failover may occur automatically (e.g., upon detecting a failure, upon receipt of an automated response by a metro cluster network, and/or the like) and/or manually (e.g., based at least in part on user input requesting initiation of a failover. Accordingly, embodiments enable temporary recovery to the recovery site 250 as illustrated in FIG. 2A, and eventual return to the protected site 150 upon resumption of operation of the protected site 150. It should be understood that the recovery site 250 may be a part of the data recovery system or the recovery site 250 may be operable at another location (e.g., within a separate cloud-computing environment). Such embodiments support the eventual return of the protected systems and their data to the original protected site 150 or any other site (e.g., a new site to be operated as the protected site 150), with minimal interruption to the systems' ongoing operation and continued, uninterrupted protection of the systems and their data.

In the illustrated embodiment of FIG. 2A, the systems and/or corresponding data and/or corresponding configuration information from the protected site 150 are replicated to the object store 100, for example, continuously as discussed in reference to FIG. 1, above. Upon an interruption in service of the protected site 150, the protected systems and/or corresponding data and/or corresponding configuration information (e.g., including one or more base data objects as discussed herein and/or other data objects) stored in the object store 100 are rehydrated into a runtime environment of a recovery site 250 allocated on demand. The recovery site is configured for executing a software environment (as reflected at Block 2003 of FIG. 2B), such as to execute/resume/continue the operations of the protected site 150 while the protected site 150 is inoperable. The systems may be restarted within the runtime environment of the recovery site, as reflected at Block 2004, and the system may run at least substantially as normally from the runtime environment of the recovery site 250, as reflected at Block 2005. As indicated at Block 2005, data generated during execution of the processes via the recovery site 250 (referred to herein as "deltas") are collected at the recovery site 250. In certain embodiments, rehydration of configuration information utilized to enable operation of one or more systems within a recovery environment may encompass reconfiguration of certain configuration information. For example, memory allocated to one or more software applications executing for a system within a recovery site may be reduced so as to optimize overall performance of the system (e.g., in a recovery site having less overall memory available for allocation). As another example, network settings of the configuration information may be changed during a failover operation to enable operation of the one or more systems within the recovery site. However, the original configuration information may be maintained within the object store so as to enable recovery of the original configuration information when operations resume at the protected site 150.

Because operation within the recovery site 250 is intended to be temporary, and data generated by the protected site 150 is already stored within the object store 100, any potential data loss from a failure of the recovery site 250 would be minimal (e.g., limited to any new data generated during operation of software via the recovery site 250). Accordingly, in the illustrated embodiment of FIG. 2A, the recovery site 250 is itself unprotected (e.g., data generated via the recovery site 250 is not stored within the object store). However, it should be understood that in certain embodiments the recovery site 250 is stored in case of loss of functionality of the recovery site 250. Replication of data of the recovery site 250 could be performed to the object store 100 or a separate object store (not shown). Moreover, replication of data generated during operation of systems at the recovery site may be performed in a manner analogous to replication of data from the protected site 150, as discussed herein. Moreover, such replicated data stored within the object store may be associated with data of the original protected site 150, thereby enabling generation of a cohesive set of recovery data objects to be associated with the protected site 150, regardless of where/when the data is generated. Even in such configurations however, it should be understood that various data objects may comprise tags (e.g., metadata tags) indicating whether the data was generated via systems executing at the protected site 150, at a recovery site, or at another location (e.g., a previous protected site that was replaced after a hardware system failure), thereby enabling data to be distinguished, if needed.

The systems running within the runtime environment of the recovery site 250 may be recovered to the original protected site 150, or recovered to an alternative protected site 150 in certain embodiments. Upon detecting that the protected site 150 is recovered as reflected at Block 2006 (e.g., based on manually provided user input and/or automated determinations), data may be recovered from the object store 100 (e.g., data replicated to the object store 100 prior to the failure of the protected site 150) back to the protected site 150 (e.g., by replicating data back to the protected site 150) and running systems may be migrated back to the protected site 150, from the recovery site 250, for example, based on user input initiating migration back to the protected site 150, as reflected at Block 2007. Moreover, as reflected at Blocks 2008-2009 of FIG. 2B, the running systems are shut down within the recovery site 250, and any data generated during execution of the processes via the recovery site 250 (deltas) are provided from the recovery site 250 to the protected site 150 such that the protected site 150 reflects a most up-to-date version of data of the running processes, including data generated while the protected site 150 was offline and the systems were operating via the recovery site 250. The systems are then restarted within the protected site 150, and new data generated since the protected site 150 last failed (including deltas generated by the recovery site 150) are replicated to the object store 100 (e.g., after providing the new data into one or more data objects).

FIGS. 3A-3B show the use of the systems and methods (e.g., embodied as software) for replication of a protected site's 150 systems' data and configuration information to an object store 100, with recovery of the protected systems and their data, and resumption of operations via a recovery site 250 operating in the same environment as the object store 100 (e.g., a cloud-based environment). As shown in FIG. 3B, data is continuously captured from the protected site 150 (e.g., via IO filters operating as discussed herein) for replication to the object store 100 of the data recovery system, as shown in Block 3001. Upon the failure of the protected site 150 (detected, as reflected in Block 3002), the object store 100 of the data rehydration of the systems and their data and configuration information may be initiated into a recovery site 250 which may be located at the location of the object store 100 as shown in FIG. 3A, and as reflected at Block 3003 of FIG. 3B. Because an object store 100 is not a filesystem-based runtime environment capable of supporting compute operations, the systems and their data and configuration information are extracted ("rehydrated") from the object store 100 into the recovery site 250 environment with appropriate compute, storage and network resources. The systems are then restarted within the recovery site 250, as reflected at Block 3004, and the systems run within the recovery site 250, as reflected at Block 3005.

FIGS. 3A and 3B show how, in certain embodiments, as the recovered systems are deployed to the recovery site 250, the recovered systems operating in the recovery site 250 execute mechanisms for capture and replication of newly created data to the same object store 100 from which the systems, data and configuration information were rehydrated, in a manner similar to the method for disaster recovery that was originally provisioned in the protected site 150. For example, as new data is created during execution of the systems in the recovery site 250, data is replicated to the data store for storage therein. This data may be combined with data replicated to the data store from the protected site 150 so as to provide a consolidated data store corresponding to the protected site 150. In this manner, the systems, data and configuration information continue to be protected during execution of the systems in the recovery site 250 by the object store 100.

As reflected within FIGS. 3A-3B, the systems running within the runtime environment of the recovery site 250 may be recovered to the original protected site 150 or recovered to an alternative protected site 150 in certain embodiments. Upon detecting that the protected site 150 is recovered as reflected at Block 3006 (e.g., based on manually provided user input and/or automated determinations), data may be recovered from the object store 100 (e.g., data replicated to the object store 100 prior to the failure of the protected site 150 and/or data replicated to the object store 100 from the recovery site 250 during execution of the systems at the recovery site 250) back to the protected site 150 (e.g., by replicating data back to the protected site 150) and running systems may be migrated back to the protected site 150, from the recovery site 250, for example, based on user input initiating migration back to the protected site 150, as reflected at Block 3007. The running systems are shut down within the recovery site 250, as reflected in Block 3008, such that the systems are then only running within the protected site 150.

Figure 4A:
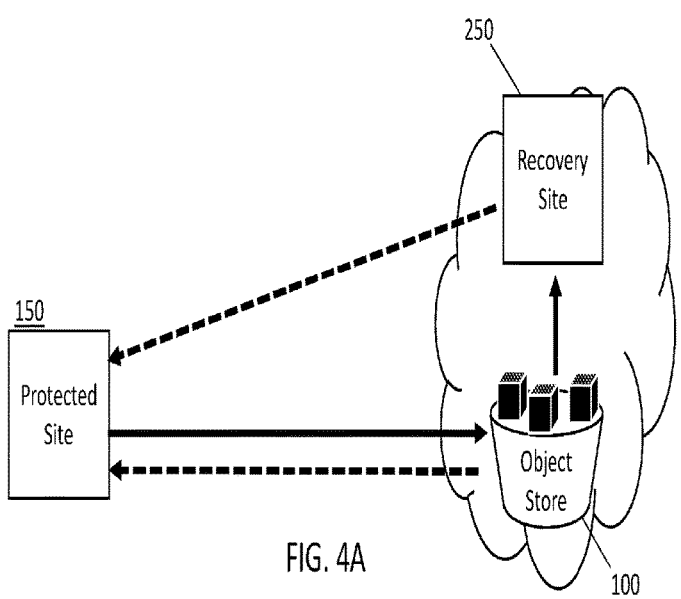
FIGS. 4A-4B show data replication to an object store, with systems failing over to a recovery site co-located with the object store, and, upon the restoration of the protected site, live "fail-back" of the systems to the protected site. In failover method, the illustrated recovered systems do not replicate data to the object store. When systems fail back to the protected site, their original data is recovered from the object store, and data that was newly created in the recovery site (the "deltas") is recovered directly from the runtime environment in the recovery site.
Figure 4B:
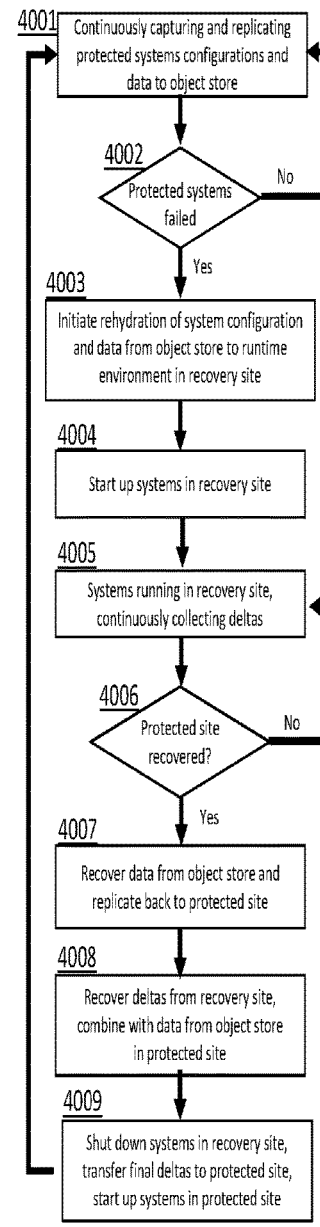

FIGS. 4A and 4B show that in certain embodiments, if mechanisms for DR-based replication to the object store 100 are not available, data generated by systems recovered to the recovery site 250 can be captured for the purpose of data consistency in failback to the protected site 150. As shown in FIG. 4B, data is continuously captured from the protected site 150 (e.g., via IO filters operating as discussed herein) for replication to the object store 100 of the data recovery system, as shown in Block 4001. Upon the failure of the protected site 150 (detected, as reflected in Block 4002), the object store 100 of the data rehydration of the systems and their data and configuration information may be initiated into a recovery site 250 which may be located at the location of the object store 100 as shown in FIG. 4A, and as reflected at Block 4003 of FIG. 4B. Because an object store 100 is not a filesystem-based runtime environment capable of supporting compute operations, the systems and their data and configuration information are extracted ("rehydrated") from the object store 100 into the recovery site 250 environment with appropriate compute, storage and network resources. The systems are then restarted within the recovery site 250, as reflected at Block 4004, and the systems run within the recovery site 250, as reflected at Block 4005. The system may run at least substantially as normally from the runtime environment of the recovery site 250, as reflected at Block 4005.

After systems resume operations in the recovery site 250, any new data that has been written and configuration information that has been updated (referred to herein as the "changes" or the "deltas") are accumulated in the recovery site 250, as indicated at Block 4005. These deltas may be replicated to the object store after resuming operations at a protected site 150 in certain embodiments. Monitoring of the protected site 150 continues in accordance with certain embodiments (e.g., automatic monitoring or manual monitoring, performed in association with user input indicative of a trigger event to initiate migration of operations back to the protected site 150) so as to determine when the protected site 150 has been recovered for operation again (as reflected at Block 4006). As reflected in FIG. 4B, the restoration of the systems and their data to operation in the original protected site 150 (or a replacement protected site 150) comprises a two-phase process in accordance with certain embodiments. The systems and their data are recovered from the object store 100 to the protected site 150, as reflected at Block 4007. The recovered objects represent the earlier state of the systems and their data, prior to resuming operations in the recovery site 250 (e.g., while the systems were still operating in the protected site 150). The deltas that have been generated at the recovery site 250 have been continuously collected, and are applied to the systems and their data in the original protected site 150 as reflected at Block 4008 of FIG. 4B by providing data indicative of the deltas from the recovery site 250 to the protected site 150 (and those deltas are then provided to the object store 100 for storage in a manner analogous to typical data storage from the protected site 150). Then the recovered systems running in the recovery site 250 are powered down as reflected at Block 4009, the final deltas are sent from the recovery site 250 to the protected site 150, and the corresponding systems are powered on in the protected site 150.

In embodiments in which data is replicated from the recovery site 250 to the object store (e.g., while the protected site 150 is inoperable), restoration of the systems and their data to operation in the original protected site 150 (or a replacement protected site 150) proceeds with recovery of the systems and their data from the object store 100 to the protected site 150, including data generated while the systems were executing at the recovery site 250.

In embodiments in which deltas are collected (or data that would be considered deltas under the model discussed above) are reflected within the object store 100, and accordingly these deltas are recovered to the protected site 150 from the object store 100. This method is illustrated in FIG. 4A-4B. Recovery from the object store 100 in accordance with the configuration reflected in FIGS. 4A-4B is incremental. Failover systems running in recovery site 250 are stopped for a very short time to ensure all data is restored to systems in the protected site 150.

Such embodiments provide a method for maintaining business continuity by resuming operations as quickly as possible, even if resuming operations at the original protected site 150 is not possible for some extended period of time, such as during a fire, flood or other natural disaster, or a severe hardware failure. Such embodiments support the eventual return of the systems and their data to the original protected site 150 or any other site. In the event that systems and data are returned to a replacement protected site 150, the data replication to the object store 100 continues as the systems resume operations in the replacement protected site 150.

Figure 5:
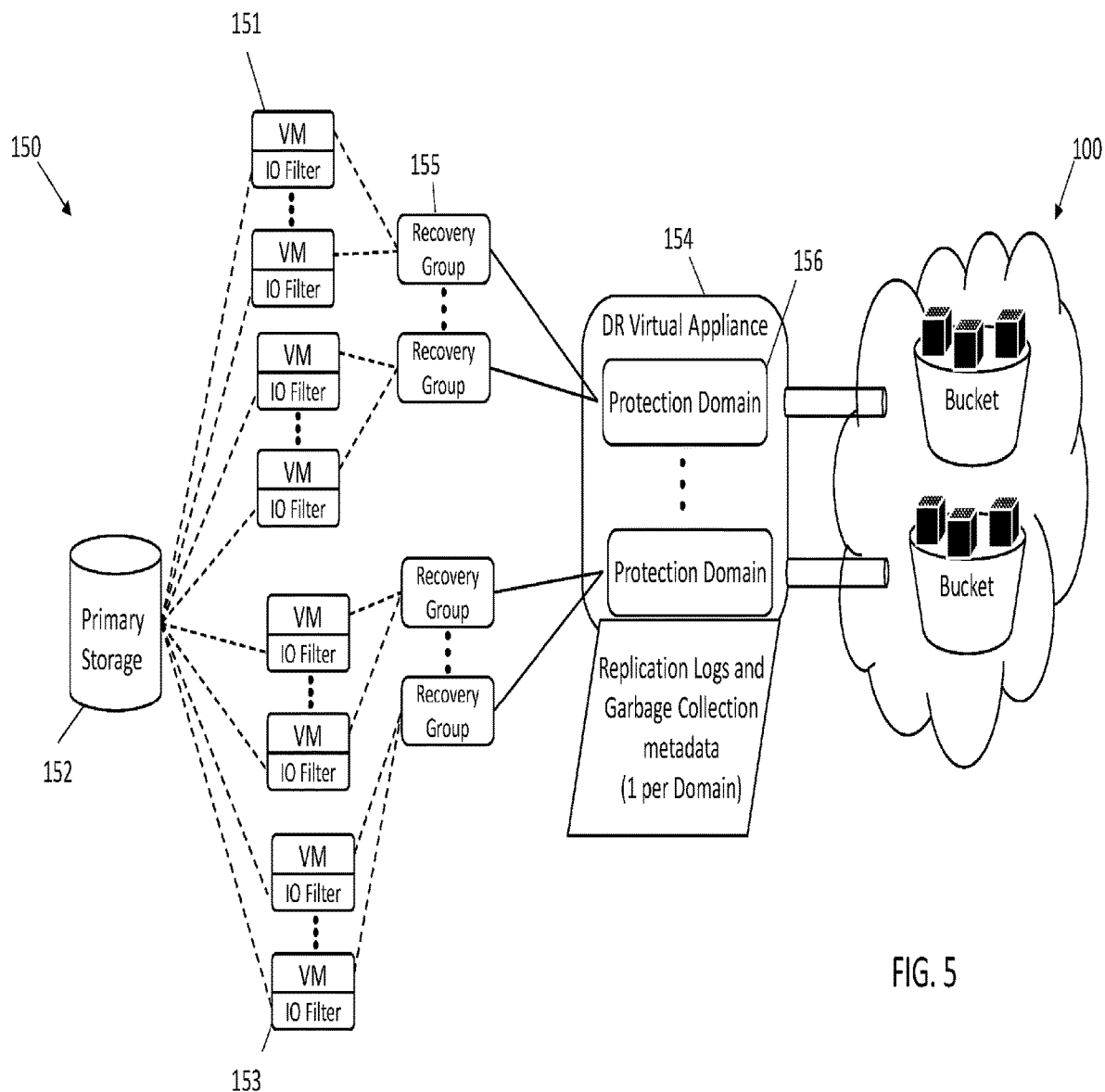
FIG. 5 shows the configuration of the main software entities comprising the system for data replication from a protected site to an object store.

Although it should be understood that in certain embodiments, a single protected site 150 may be in direct communication with an object store 100 of a data recovery system (e.g., via one or more IO filters), various embodiments may utilize one or more recovery groups and/or disaster recovery virtual appliances to facilitate efficient storage of data within the object storage 150. FIG. 5 illustrates the configuration of various components according to one embodiment. It should be understood that such components may be provided as software components. In the illustrated embodiment, a protected site 150 may be characterized by a plurality of virtual machines (VMs) 151 in communication with primary storage 152 of the protected site 150. Moreover, each virtual machine 151 has an IO filter 153 for intercepting data as it is written to local primary storage 152 during typical operation of the virtual machine 151 and for continuously replicating the data through a protection domain to the object store 100. Initiating protection for a VM 151 does not require restarting the VM 151, and a VM 151 can be protected even if it is shut down.

In certain embodiments, when a protected site's 150 system is protected, data written by the system is intercepted by a filtering mechanism in the data path (e.g., an IO filter 153). The IO filter 153 continuously replicates the data from the virtual machine 151 to a replication log maintained at a disaster recovery virtual appliance 154, which may be operating at the protected site. The level of protection granularity is the virtual disk. Different filtering mechanisms may be used for different types of protected systems.

In certain embodiments, when a running system (e.g., in a protected site 150) is selected for protection, two data replication processes are initiated: a background replication process that creates a full copy of the protected system's stored data and configuration information in the object store 100, and a foreground replication process that replicates newly written data that is generated during the background replication process. If a system is not running when it is selected for protection and new data is not being written by the system in the primary environment (e.g., to primary storage 152), data replication comprises background replication only. After a running system has completed its background replication, the data replication process for the system comprises only foreground replication. At this point the protected system is recoverable from the object store 100.

In embodiments in which the method of intercepting data comprises an TO filter 153 for a virtual machine 151 (or other virtualization platform), the data intercept mechanism may not have dependencies on the configuration of the data storage mechanisms in the protected site 150. In certain embodiments, the protected site 150 may utilize any datastore type compatible with the virtualization platform, including but not limited to Storage Area Network (SAN), Network Attached Storage (NAS) or server-integrated storage commonly referred to as hyper-converged infrastructure (HCI).

As data is written to local, primary storage 152 at the protected site 150, data is captured synchronously in a replication log in the protected environment (e.g., within a disaster recovery virtual appliance 154). In certain embodiments, configuration information is captured at the data recovery system asynchronously. From the replication log, data is replicated asynchronously to the object store 100.

Systems of the protected site 150 may be protected independently of each other (e.g., virtual machines 151 may be protected separately). In certain embodiments, multiple logically related systems (e.g., multiple virtual machines 151) may be assigned to a recovery group 155, so that if any system in the group fails over to the recovery site, all systems belonging to the group fail over to the recovery site as well. Data replication may be consistent across all systems in a recovery group, such that when recovered systems are started in the recovery environment, they are consistent (e.g., crash consistent). For example, for clustered applications operating in association with a plurality of compute nodes accessing a shared body of data, these applications and the corresponding compute nodes begin execution within the recovery environment having access to the shared body of data in a consistent data state, so as to avoid inconsistencies in execution of these clustered applications.

A protection domain 156 is a software replication mechanism or "pipe" with defined endpoints including virtual resource pools and physical resources including but not limited to compute cluster, network and datastore for both the protected site 150 and the recovery site 250 such that data for a particular protected site 150 is provided to a specific container corresponding to the protected site 150. The protection domain 156 of certain embodiments may define access rights to the container, such as utilizing authentication credentials, encryption keys, and/or the like. A protection domain 156 can include multiple recovery groups 155, and in certain embodiments recovery groups 155 can be moved from one protection domain 156 to another, for example, for load balancing. Data replication is crash-consistent across all systems belonging to a protection domain 156. Each protection domain 156 has a dedicated bucket or container in the object store 100.

Each protection domain 156 within the disaster recovery virtual appliance 154 has its own replication log to which data is written synchronously or asynchronously, and from which data is replicated to the object store 100 asynchronously. The replication log capacity may increase or decrease in size depending on the protection domain's 156 requirements. If the replication log is approaching its capacity limit, due to increased data IO activity in protected environment of the protected site 150 or a temporary reduction in available network bandwidth, backpressure may be applied to the local primary storage 152 automatically.

In the illustrated embodiment, protection domains 156 run in DR virtual appliances (DRVAs) 154 at the protected site 150 as discussed herein, which also maintain replication logs on dedicated virtual storage logical units (vLUNs). DRVAs 154 are highly available and each may be configured for supporting one or more protection domains 156, and additional DRVAs 154 can be added dynamically. If a DRVA's 154 operation is interrupted, its protection domains' protected systems can continue to write data to primary storage 152, and the replication delta is collected by the IO filters attached to the protected systems 153 until the DRVA 156 is recovered and replication to the object store 100 can resume. Such embodiments thereby provide write operations to both primary storage 152 and the object store 100 with minimal cloud-based computing resources and efficiently utilizing primary site compute and storage resources for data replication processes (e.g., protection domains 153) between the protected site 150 and the object store 100. For example, a single protection domain may be utilized for creating and replicating data objects to the object store for numerous protected systems. The delta metadata is highly available and can be saved persistently in the event the protected system reboots or is shut down temporarily.

Figure 6A:
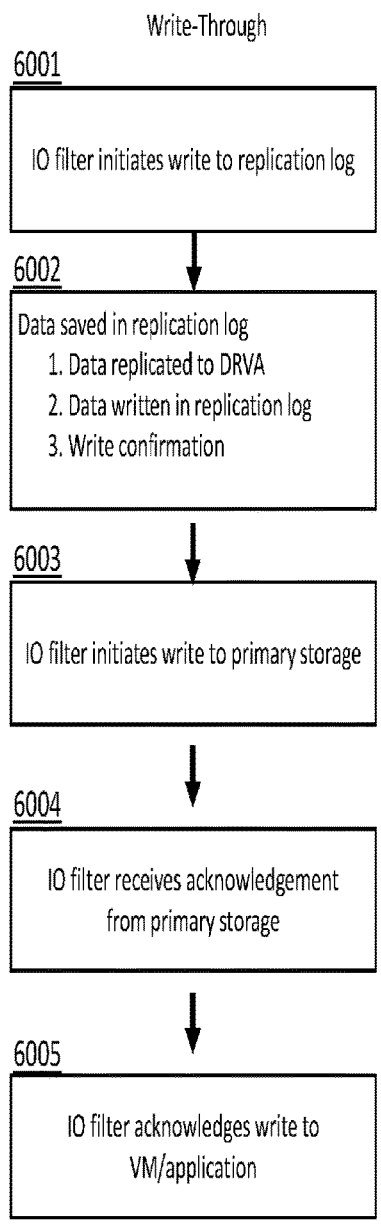
FIGS. 6A-6B show methods by which the process used by a protected computing system to write data to its primary storage system may be related to the process by which the same data is written to the replication log. In the write-through method, the IO filter acknowledges the completion of a write operation back to the protected system only after it has received acknowledgement of the write from both the replication log and the primary storage. In the write-back method the IO filter acknowledges the completion of the write operation to the protected system upon receiving the write acknowledgement from the replication log; and the write to primary storage is asynchronous.
Figure 6B:
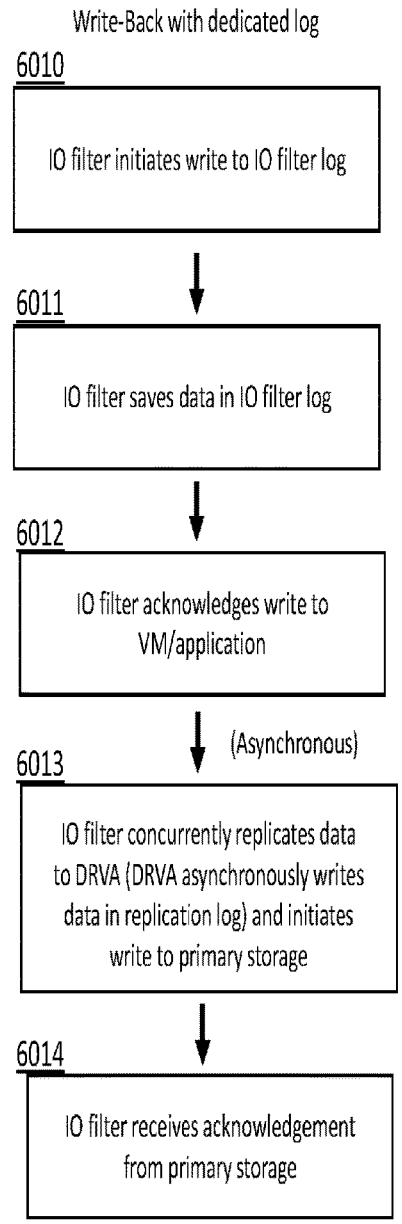

Two example methods of write handling are available for the protected systems as reflected in FIGS. 6A-6B: write-through and write-back. In the write through method, the IO filter 153 acknowledges the completion of a write operation back to the protected system only after it has received acknowledgement of the write from both the replication log and the primary storage. As reflected in FIG. 6A, certain embodiments of the write through method are characterized by an IO filter 153 initiating a write operation to the replication log of the DRVA 154, as indicated at Block 6001. Data is saved in a replication log of the DRVA, and the DRVA 154 provides an acknowledgement back to the IO filter 151, as reflected at Block 6002. After receipt of the acknowledgement from the DRVA 154, the IO filter 153 initiates a write operation to the primary storage at the protected site 150, as indicated at Block 6003, and the IO filter 153 receives a subsequent acknowledgment from the primary storage at Block 6004. Thereafter, the IO filter 153 acknowledges the write to storage back to the VM 151, as indicated at Block 6005.

In the write-back method, as reflected in FIG. 6B, the IO filter 153 immediately writes to an IO filter log associated with the IO filter 153 and acknowledges the completion of the write to the protected system upon receiving the write acknowledgement from the IO filter log; and the write to the DRVA 154 and its replication log and the write to primary storage 152 are asynchronous. As reflected specifically in FIG. 6B, the IO filter 153 first initiates a write to the IO filter log, as reflected at Block 6010. As reflected in Block 6011, the IO filter 153 saves data in a dedicated log (the IO filter log). Upon receipt of the acknowledgement of the write to the dedicated IO filter log, the IO filter 153 acknowledges the write operation to the VM 151, as indicated at Block 6012. Asynchronously, the IO filter replicates data to the DRVA and initiates a write to the primary storage of the protected site 150, as indicated at Block 6013, and the IO filter receives an acknowledgement from the primary storage, as indicated at Block 6014. By acknowledging the write back from the IO Filter's dedicated log, and subsequently writing to primary storage and the replication log through the DRVA 154, write latency is substantially reduced. However, even when the write-back method is employed, if the asynchronous write to primary storage fails, the corresponding data in the replication log is invalidated and is not replicated to the object store.

Within the object store 100, the protected sites' 150 protected systems' data and their configuration information are captured in two separate sets of objects: data objects and configuration objects. When extracted from the object store 100, the two types of objects contain all information required to reconstitute the systems, their data (in a consistent state) and all configuration information. During normal data replication from the primary site, multiple objects may be replicated concurrently to the object store 100. Metadata attached to the data enable recovery with write-order fidelity for state consistency.

In certain embodiments, objects are written in a log-structured manner and cannot be modified once written to the object store 100. Once an object has been written, new data with the same offset is written in a new object. Multiple data items may be combined in a single object for more efficient replication to the object store. The object size is configurable and may be determined based on the optimal size for the particular type of object store 100 employed. In some circumstances object size may vary. The determination of the object size may be affected by recovery point objectives, as a larger object size will result in a greater recovery point objective.

Operations related to replication and recovery of data to and from the object store 100 may comprise standard commands, such as: put, get, enumerate and delete. The use of a limited set of standard commands enables compatibility with any standard object storage platform (e.g., S3 compatible object store or blob storage). In certain embodiments, the software does not execute additional computing processes in the object store environment beyond the normal computing operations of the object storage platform.

In the event of a system recovery operation, runtime compute resources may be allocated on demand for the systems to be recovered. As discussed herein, a recovery system may comprise sufficient compute resources to support one or more systems executing within respective recovery environments (e.g., recovery sites 250), however the recovery system may not comprise sufficient resources to support a simultaneous recovery of all systems protected. In other embodiments, the recovery system may be in communication with expandable compute platforms, such as one or more cloud-based systems offering isolated, expandable compute environments that may be utilized as recovery sites 250 for a plurality of recovery operations each corresponding with a respective protected site 150. According to certain embodiments, there is no need for runtime systems (compute, network, storage) to be dedicated to specific protected systems in the recovery environment except in the instance of system recovery. During normal operations (no systems recovery needed), protected systems only need access to the object store in the recovery environment. This enables highly efficient utilization of runtime resources when an organization provides recovery services for multiple tenants. It may also reduce recovery time objective (RTO) if runtime infrastructure resources can be allocated for use by multiple tenants on demand, in advance of any recovery operation.

a. Garbage Collection

Due to the log structured method by which data is continuously appended to existing object store content, the removal of invalidated data through processes commonly known as garbage collection, is required. The garbage collection process identifies objects in the object store for deletion based on the amount of invalid or obsolete data they contain, for example, as a result of data objects having been overwritten (invalidated) in the primary storage environment. When an object in the object store has been identified for deletion, any valid data in the object are re-read from primary storage and included in a new object that is appended at the head of the object store log. Various embodiments (e.g., software configurations) provide garbage collection operations for the object store at the protected site 150 by reading data from primary storage 152, without reading data back from a cloud-based environment (which would may be costly in terms of financial cost as well as network bandwidth utilization) or executing garbage collection operations in the object store 100 (which would also be costly in terms of financial costs and compute and storage systems utilization in the recovery environment). To provide garbage collection in the object store 100, a metadata model is used to describe all data items written in the object store 100 (and stored within primary storage 152), and to help identify the best candidate objects for garbage collection. In certain embodiments, using various metadata, such as data locality and update timestamps associated with objects, objects are categorized by "temperature," such that "hot" objects have a higher probability of their content being updated than "cold" objects. It should be understood that other implementations may utilize other metadata to identify prospective candidate data objects for data collection. An adaptive software algorithm uses information including the amount of garbage accumulated and the most recent update timestamp to select the best candidates for garbage collection. The software algorithms run in the protected environment on the protected site 150 and do not require access to data from the object store 100. Instead (as was previously described) the data input to the algorithm is read from the primary storage 152 in the protected site 150. The garbage collection method also provides required write affinity, so that data that is updated frequently are combined in "hot" objects, and data that are updated less frequently belong to "cold" objects. Old objects are deleted once all still-valid data are persistent and belong to a consistent region.

Data objects may contain multiple data items that may belong to different systems (e.g., virtual machines) in the protected site 150 and different primary storage entities (e.g., virtual disks). Each data item comprises metadata and a payload. The metadata identifies the data item (e.g., virtual disk ID, offset and length) and also contains a sequence number which is used to ensure write order fidelity during recovery from the object store 100. Multiple objects, which may encompass hot and/or cold objects, are written to the object store 100 concurrently. When an object is deleted in the course of garbage collection, it creates gaps in the set of sequence numbers, which may cause issues in certain embodiments of determining whether a set of objects and data are consistent (e.g., determining whether gaps in sequence numbers are desired and caused by garbage collection or whether gaps in sequence numbers are attributable to an incomplete set of data). Sequence numbers enable the recovery of objects and data in the correct order even if gaps were created by garbage collection or if objects were received by and written to the object store 100 out of order, that is, in an order other than that in which they were created at the protected site 150. However, the gaps in the set of sequence numbers introduce the problem of assuring consistency, that is, confirmation that up to a given point in the sequence the data in the object store 100 corresponds exactly to the data written to primary storage in the protected site 150. Consistency points are created regularly, and as frequently as possible in order to support the shortest possible recovery point objective.

In order to ensure consistency when garbage collection operations have introduced gaps in the sequence numbers, a "watermark" method is employed to identify known consistency points. A watermark is a special sequence number or other unique identifier that identifies a consistency point for a set of objects and their data. Watermarks are generated in the primary site as metadata for each object. For example, watermarks of certain embodiments are written in the header of each object. In certain embodiments, each watermark corresponds to a specific protection domain and is not associated with any other protection domain. Watermarks are reflected within the particular domain and identify points at which the protection domain's data is consistent. Specifically, all data items with a sequence number less than the watermark's sequence number are identified as consistent, even if gaps exist in their sequence numbers. Watermarks are written in all data objects, and multiple objects may have the same watermark sequence number. Watermark operations are correlated with garbage collection, in that garbage collection is allowed to delete an object only after all still-valid data items from the object are written in the recovery site and identified by a particular watermark. In the event that systems need to be recovered from the recovery site 250, the original systems' configuration and data can be fully recovered from the object store 100 in a procedure based on the watermarks. A full recovery is based on the latest, most recent watermark. Intermediate watermarks are used to reduce the amount of runtime recovery metadata required.

When systems fail back to the original protected site or any other protected runtime environment, the garbage collection metadata is recovered together with the systems' data and the garbage collection metadata is written persistently in the systems' protected environment, enabling the recovered systems to be protected from the same object store/protected domain immediately as the systems are started, without requiring any additional resynchronization with the object store.

b. Recovery Options

Full Recovery is one type of recovery enabled by various embodiments. Other types of recovery include, without limitation, delta recovery, version-based recovery and point-in-time recovery, described later.

In certain embodiments, full recovery comprises a full recovery of all known-consistent data at the protected site 150. For example, configuration objects (e.g., which may be embodied as base data objects in certain embodiments) are downloaded from the object store 100 and a database of configuration information is created. Configuration objects contain information and attributes that describe different recovery sites, protection domains and virtual machines. Using the most recent watermark, the most recent consistency point in the data is identified. Intermediate watermarks are also used in the rehydration process to reduce the amount of in-memory runtime metadata required. When all objects older than an intermediate watermark have been downloaded, parsed and persisted, memory resources for processing metadata can be reclaimed. Protection domains are re-established at the protected site 150 using the configuration database, which is consistent with the recovered systems. The newly re-created systems are added to the protection domains corresponding to their object store resources.

As illustrated in FIG. 2, if the protected site 150 cannot be recovered in a timely manner, the systems should be recovered in another recovery site 250. The recovery site 250 may be a thin-provisioned, multi-tenant, on-demand environment, with resources (e.g., processing resources, storage and network resources, and/or the like) that are only claimed when needed for recovery. In certain embodiments, methods that comprise recovery to a different site may comprise compute, storage and network resources are allocated for failover of the systems and their data. In various embodiments, the runtime environment and related infrastructure, including if required, the appropriate virtualization platform, are provisioned together with the recovery software, and the full recovery process is initiated. Recovered systems are restarted in the recovery site. Deltas (if applicable), specifically newly written data and any configuration changes, may be accumulated under certain embodiments and will be applied to systems when they fail back from the recovery site. Deltas may be captured in bitmap form, or any other form. The delta metadata is stored persistently and redundantly for high availability, so it can be recovered even in the event of a system failure. However, it should be understood that data generated at a recovery site (e.g., during a recovery operation) may be written directly to the object store and incorporated into the data store corresponding to the protected site without requiring transfer from the recovery site to the protected site.

The restoration of the systems in the original protected site 150, called the fail-back process, includes providing systems and their data and their configuration information back to the protected site 150 to reinitiate normal operation. Sufficient compute, storage and network resources are confirmed available in the protected site 150 (e.g., by a system administrator) prior to initiating fail-back procedures. The runtime environment and related infrastructure, including if required, the appropriate virtualization platform, are provisioned, together with the recovery software (e.g., by a system administrator). Systems and their data are rehydrated from the object store 100. Protection domains 154 are re-established using the existing object store buckets or containers. In certain embodiments, the re-created systems are consistent with the object store 100 but are not consistent with the failed over systems running in the recovery site 250 due to new data that has been written and possible configuration changes that may have taken place (the deltas) during execution of the systems at the recovery site 250. However, in other embodiments, re-created systems may be consistent with the object store 100 and may be consistent with failed over systems running in the recovery site 250 in embodiments in which data is written from the recovery site 250 into the data store 100.

In certain embodiments, once rehydration of the systems in the protected site 150 is complete, the accumulated deltas are applied from the recovery site 250 to the systems in the protected site 150 (if applicable). The systems continue running in the recovery site 250 while data and deltas are transferred up to the time that the recovered systems are ready to resume operations in the protected site 150. This recovery method is called "live fail-back." Concurrent with the application of the deltas to the VMs 151 in the protected site 150, the systems' deltas are applied to the appropriate buckets in the object store 100. When the incremental deltas have been applied to the recovered systems in the protected site 150 and to the object store 100, the systems in the recovery site 250 are shut down, the final deltas are applied to the systems in the protected site 150, and the systems in the protected site 150 are powered on. The systems are consistent with the data in the object store 100, and protection resumes immediately on start-up without requiring additional synchronization.

In certain embodiments, the protected site 150 might be down (e.g., in a failed state) for a limited, relatively short amount of time (from several hours to several days). For example, failover may happen as a result of temporary power outage. However, the protected systems of the protected site 150 may be failed over to a recovery site 250 if this period of service interruption is unacceptable. When the protected site 150 is restored, the state of the systems may be recovered, including all data consistent up to the point of the failure incident. In this case, the accumulated, incremental deltas may be transferred to the original protected site 150, and because the data generated up to the point of failure is recovered in the protected site 150, the deltas are sufficient for a complete recovery of the systems from the recovery site 250. This type of recovery is called "delta recovery."

Point-in-time recovery may be utilized in situations like severe data corruption, malware intrusions or ransomware attacks. In these situations, the hardware may be operational but the software is not. The methods of continuous data protection and the log-structured design of the object store 100 provide the necessary components for point-in-time recovery. The content in the object store bucket or container is used as "undo" and "redo" logs. Navigating backward and forward through the sequence of writes captured in the object store 100 allows the selection of the optimal recovery point for each system. Data is restored for the system up to the optimal point, and no additional resynchronization is required as the system resumes operation with full protection. Point-in-time recovery is generally used within a relatively recent time period, with a point-in-time recovery window that may be defined in terms of time (hours, days, weeks) or the amount of newly written and replicated data. The window size for point-in-time recovery can be defined at the level of individual systems or groups of systems.

Navigation through the point-in-time window is based on sequence numbers, so garbage collection is not applied to objects within the point-in-time window. When point-in-time recovery is enabled, the objects in the bucket or container are separated into two groups: the "base" data objects and the "point-in-time recovery window" data and configuration objects. Garbage collection executes only on objects in the base. The base and point-in-time recovery window may have different control structures in certain embodiments. To support point-in-time recovery to objects in the point-in-time recovery window, additional metadata is applied that links the object ID with a particular timestamp. When a new object is put into the bucket the oldest object in the point-in-time recovery window is merged to the base.

Following the log-structured method, new objects are put at the head of the bucket, even if they contain data captured through garbage collection. However, old objects that the garbage collection process would normally delete will not be deleted if they are still in the point-in-time recovery window, to ensure point-in-time consistency within the point-in-time recovery window. Certain embodiments provide multiple ways to trigger the deletion of an old object. The object manager may keep a list of objects to be deleted in memory. Additionally, when the object is pushed from the delta and merged with the base, it will eventually undergo sufficient garbage collection that its content is entirely invalidated, and it is deleted automatically.

Figure 7:
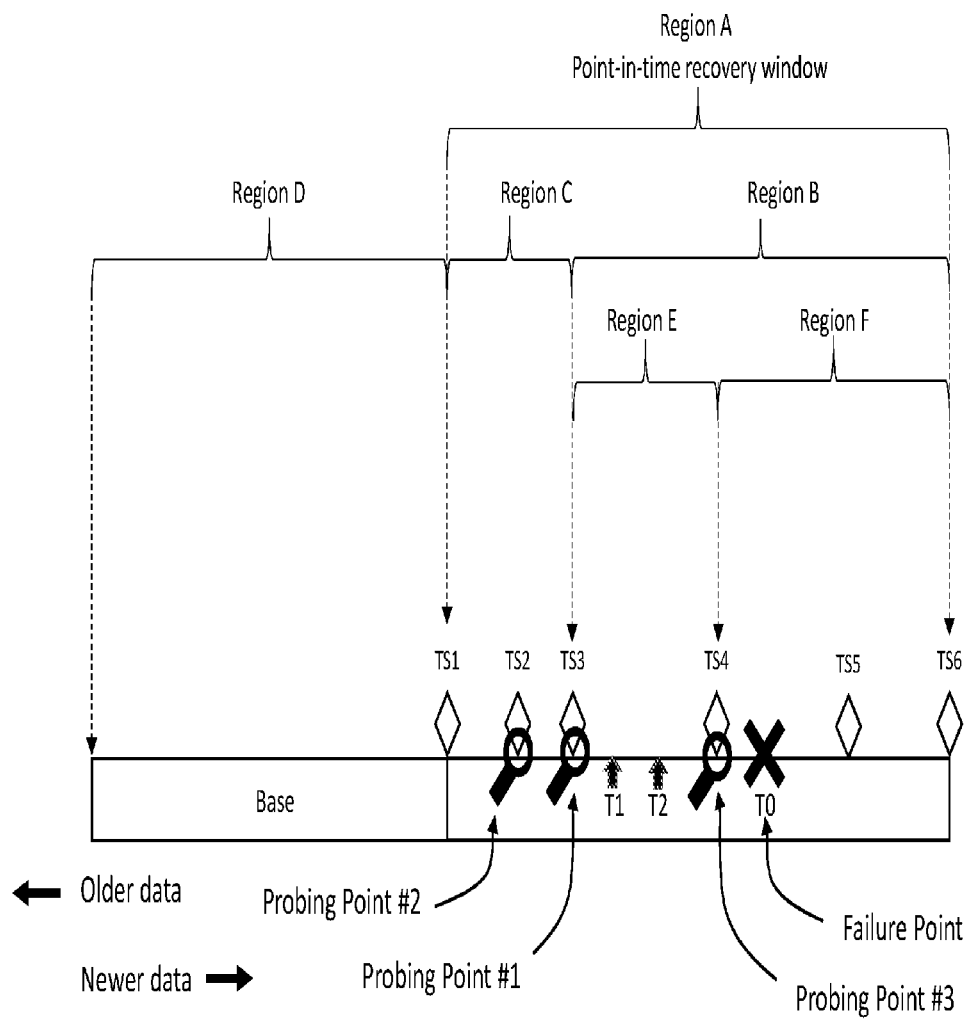
FIG. 7 shows an example of a point-in-time recovery procedure.
Figure 8:
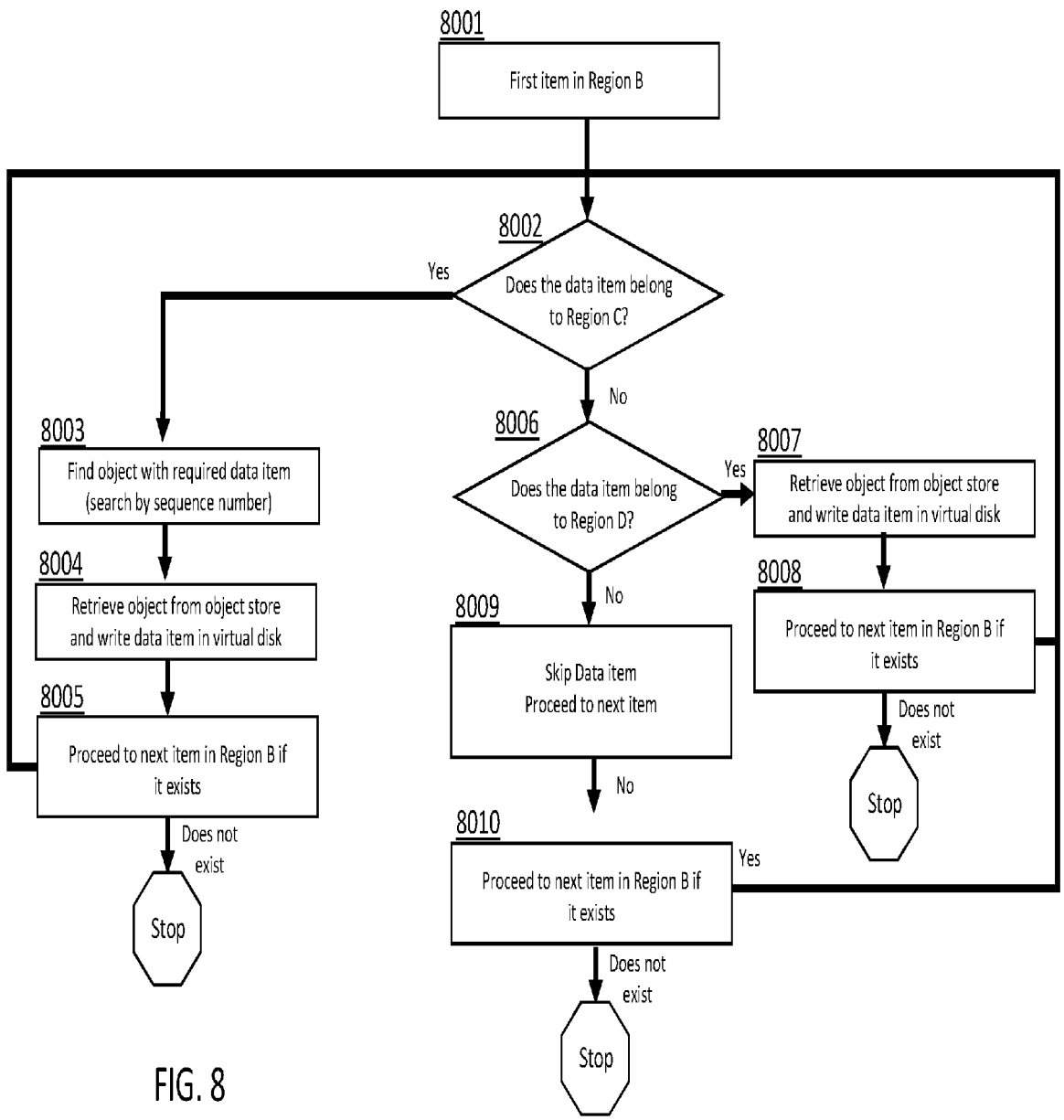
FIG. 8 shows the process for determining the appropriate action when sorting data items during point-in-time recovery.

FIG. 7 shows an example demonstrating the method for point-in-time recovery and FIG. 8 illustrates a flowchart discussing various steps associated with point-in-time recovery, and the use of timestamps to recover virtual machines at the optimal point-in-time. Some or all objects may have timestamps that link them to a definite point in time. Timestamps may be generated in the primary site (or in the object store in certain embodiments) as metadata for each object and may be reflective of the time the corresponding object was created. For example, time-stamps of certain embodiments are written in the header of each object. Point-in-time recovery is a data recovery method based on timestamps, or more specifically, the object with appropriate timestamp. The relationship between timestamps and objects IDs is persistent, and may, for example be based on the initial time of creation of the object (and corresponding object ID).

In the example, the actual failure occurred at point TO (which occurs in the illustrated Region B, as reflected at Block 8001 of FIG. 8 and the illustration of FIG. 7). An administrator may examine system and application log files or other information (e.g., via variety of user interfaces accessible to the administrator), to determine an approximate estimation of the time of the failure. In FIG. 7, the administrator has selected T1 as the recovery point-in-time. The most recent timestamp prior to T1 is TS3. The administrator follows the method described below to recover the state of the affected systems at T1.

The system administrator identifies the recovery group, which is the set of affected virtual machines that will be recovered with their virtual disks in their state at the selected recovery point-in-time. All virtual machines in the recovery group are shut down or confirmed to be shut down. The most recent timestamp prior to T1 is identified, in this example, TS3. The selected timestamp is used as the "probing point" as depicted in FIG. 7 as "Probing Point 1." Using the native snapshot capabilities of the virtualization platform, snapshots are created for a plurality of the virtual machines (e.g., all virtual machines) in the recovery group. The snapshots represent a static, preserved image of the virtual machines and their virtual disks at the moment when the virtual machines were powered off and the snapshots may be utilized to revert to an unrestored state, for example, if the administrator determines that T1 is not an appropriate restoration point. All subsequent changes to the virtual disks that are made in the course of the point-in-time recovery process will occur in the delta above the snapshots. The affected virtual disks are temporarily detached from their virtual machines and attached to a special virtual appliance used exclusively for the point-in-time recovery process.

The point-in-time recovery virtual appliance initiates the roll-back process using the point-in-time recovery metadata. The virtual appliance first creates the content map of Region A, which reflects the entire point-in-time recovery window available via the object store 100, in memory. Region D, by contrast, is referred to as encompassing the base data objects. Within Region A, the virtual appliance uses sequence numbers to identify regions B and C (and the boundary indicating before and after the probing point, as shown) and build their non-persistent maps. The process for identifying the appropriate action for each data item in Region B (the roll-back area) is shown in FIG. 8. As shown, for each data item, the process determines whether the data item belongs in Region C (before the TS3 timestamp) or Region B (after the TS3 timestamp). For those data items identified as belonging in Region B, the process finds objects with a required data item for the point-in-time recovery (e.g., by searching data items by sequence number) as reflected in Block 8003. The identified objects (from Region C) are retrieved and written to the virtual disk while it is still attached to the virtual appliance, as reflected at Block 8004. The process then continues by proceeding to the next data item, as reflected at Block 8005.

For data items determined to not be a part of Region C, the process determines whether the data item belongs in Region D (the base) as reflected at Block 8006. For those data items belonging to the base, the process retrieves the object from the object store and writes the data object to the virtual machine, as shown at Block 8007, and the process proceeds to the next data item, as shown at Block 8008. For those data items not identified as being a part of the base or Region C (and therefore belonging to Region B, after the TS3 timestamp, which is the intended point-in-time recovery point) are skipped as reflected at Block 8009. The process repeats for all data items in Region B.

When all virtual disks belonging to the affected virtual machines are rolled back to the point-in-time corresponding to TS3, the point-in-time virtual appliance is stopped and the virtual disks are re-attached to their original virtual machines. Prior to restarting the virtual machines, another snapshot is created. The virtual disk now comprises at least the following components: (a) the content with the "frozen" initial content; (b) a snapshot with the point-in-time recovery data that corresponds to the point-in-time of TS3; and (c) the "top" for updates that will be generated as the virtual machine resumes operation at the probing point. The virtual machine is then restarted. The system administrator checks data consistency and data integrity for the applications in the virtual machines.

The point-in-time recovery process supports repeated navigation through the chronology of the data, in order to identify the best recovery point. If the administrator determines that there are still problems with the data image recovered at the first probing point, the data can be recovered from an earlier point in time such as one closer to timestamp TS2. If the administrator observes that the recovered data image is not damaged by the failure, and wishes to try a more recent recovery point in order to minimize data loss, it is possible to probe at a more recent point in time, such as T2, whose next closest timestamp is TS4. Because the timestamp closest to probing point 3 is TS5, data must be differentiated between Region E and Region F. To distinguish between data within Region E and Region F, the data is distinguished by the following process.

Virtual machines are powered off, and the virtual machines are reverted to the latest snapshot. The changes that the virtual machines produced during the testing of Probing Point 1 are discarded. A point-in-time virtual appliance is re-created, for reattaching the virtual disks. The point-in-time virtual appliance is then used to identify the objects and data items that belong to Region E, the required objects are retrieved from the object store, and the objects to obtain the data items are parsed and the data corresponding to Region E is written to the virtual disk, on top of the snapshot. The virtual machines are restarted and data consistency and data integrity is checked and confirmed for the applications in the virtual machines. If this probing point is selected as the definitive recovery point, and no more probing will be conducted, all objects and data items from region F are marked as invalid. The virtual machines are restarted.

Figure 9:
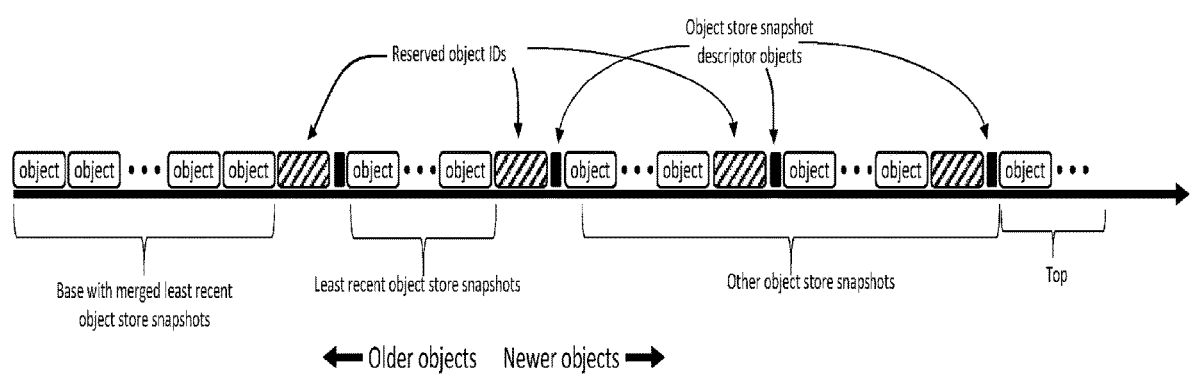
FIG. 9 shows the method for creating and managing object store snapshots which are used for the version-based recovery method.

In addition to point-in-time recovery methods, various embodiments support version-based recovery, which restores virtual machines and their data at a point in time corresponding to a particular snapshot via version base data and configuration objects. Because these snapshots are created from the object store rather than the virtualization platform, they are referred to as object store snapshots. Object store snapshots may or may not be coordinated with other snapshots, including virtual machine snapshots, or application-consistent virtualization platform native snapshot. FIG. 9 shows the design of the method for version-based recovery. These object store snapshots are identified by descriptor objects that provide metadata associated with a particular object store snapshot (e.g., and associated version base data objects), as shown in FIG. 9. For example, the object store snapshot descriptor objects provide metadata indicative of an object store snapshot identifier, a version identifier, contained object identifiers, and/or the like. Within each object store snapshot, a plurality of objects are included that collectively make up the snapshot. These objects may be collectively loaded to a virtual machine to revert the virtual machine back to a state reflected by the snapshot. Previous virtual machine images and/or snapshots can be also used for retrieving a specific type of information, such as a mistakenly deleted file, etc. Moreover, as shown in FIG. 9, each snapshot includes one or more reserved object IDs, to enable garbage collection within an object store snapshot. For example, one or more objects may be deleted within an object store snapshot during garbage collection, and one or more new objects may be generated to contain one or more data items not deleted during the garbage collection process. These new objects may use object IDs from the reserved region of object IDs dedicated to their version and/or snapshot.

When protection is started for the virtual machines, an initial full replication of all data to the object store is performed, which is the initial base. As new data is written by the protected virtual machines and new objects are created, object store snapshots are periodically created. The maximum number of object store snapshots is defined, such that the series of object store snapshots provides recovery capabilities extending back over some required period of time. The period of time protected by the version recovery method is substantially longer than the point-in-time recovery window. For example, if the point-in-time recovery window is 48 or 72 hours, the version recovery method time period may extend back for 30 days. When the maximum number of object store snapshots has been reached, the creation of a new object store snapshot causes the oldest object store snapshot to be merged with the base. The most recent objects are not yet part of any object store snapshot but eventually will be. Garbage collection can take place within object store snapshots, but a garbage collection process cannot cross the boundaries between object store snapshots. There are distinct, separate sets of garbage collection metadata for the base, for each object store snapshot, and for the top. The objects that are produced in the course of the garbage collection process within object store snapshots are appended to their respective object store snapshots using object IDs assigned from a reserved region of IDs. Reserved IDs are individually allocated for the base and for each object store snapshot as it is created. A single garbage collection process executes for the base and all object store snapshots that have been merged with the base. The garbage collection process does not use data from the object store. Rather all garbage collection objects are read from the primary data store in the protected site. Specific virtual machines or groups of virtual machines may be selected for version based recovery.

Special descriptor objects are used to identify object store versions and/or snapshots for recovery. When a specific version is selected for recovery, the last object ID is recovered from the corresponding descriptor object, and the data is rehydrated from the beginning of the sequence of objects through to the last object in the object store snapshot corresponding to the selected version.

III. Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of a data structure, apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

IV. Exemplary System Architecture

FIG. 9 provides an illustration of a recovery system 100 that can be used in conjunction with various embodiments of the present invention. As shown in FIG. 9, the recovery system 100 may comprise one or more recovery computing entities 20, one or more customer computing entities 30, one or more networks 35, and/or the like. Each of the components of the system may be in electronic communication with, for example, one another over the same or different wireless or wired networks 35 including, for example, a wired or wireless Personal Area Network (PAN), Local Area Network (LAN), Metropolitan Area Network (MAN), Wide Area Network (WAN), and/or the like. Additionally, while FIG. 9 illustrates certain system entities as separate, stand-alone entities, the various embodiments are not limited to this particular architecture.

a. Exemplary Recovery Computing Entity

Figure 10:
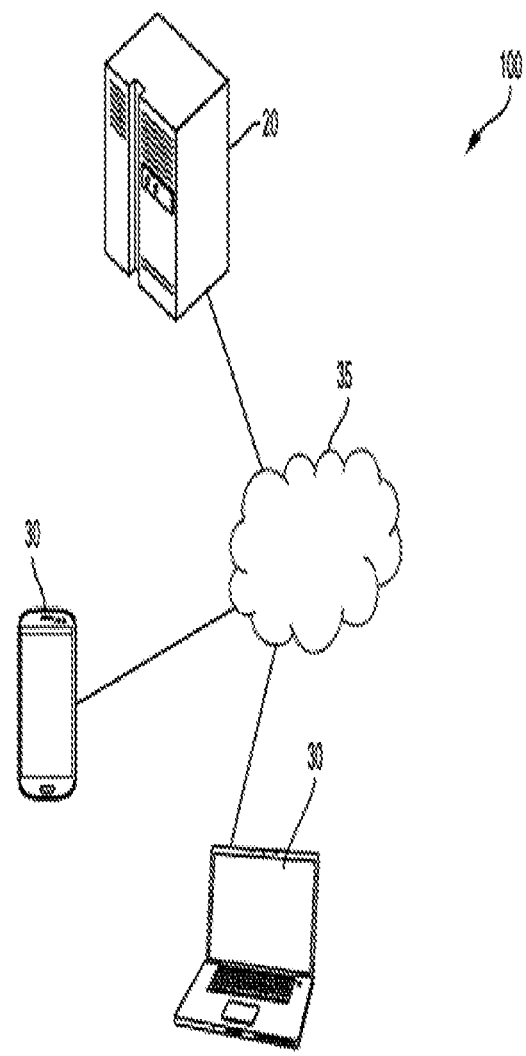
FIG. 10 shows a schematic diagram of a recovery system according to one embodiment.

FIG. 10 provides a schematic of a recovery computing entity 20 according to one embodiment of the present invention. In general, the terms computing entity, entity, device, system, and/or similar words used herein interchangeably may refer to, for example, one or more computers, computing entities, desktop computers, mobile phones, tablets, phablets, notebooks, laptops, distributed systems, items/devices, terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the recovery computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the recovery computing entity 20 may communicate with other computing systems, one or more client computing entities 30, and/or the like.

As shown in FIG. 10, in one embodiment, the recovery computing entity 20 may include or be in communication with one or more processing elements 205 (also referred to as processors, processing circuitry, and/or similar terms used herein interchangeably) that communicate with other elements within the recovery computing entity 20 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the recovery computing entity 20 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 206 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database recovery system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

Memory media 206 may also be embodied as a data storage device or devices, as a separate database server or servers, or as a combination of data storage devices and separate database servers. Further, in some embodiments, memory media 206 may be embodied as a distributed repository such that some of the stored data is stored centrally in a location within the system and other data is stored in one or more remote locations. Alternatively, in some embodiments, the distributed repository may be distributed over a plurality of remote storage locations only. As a person of ordinary skill in the art would recognize, the data required for the operation of the recovery system may also be partially stored in the cloud data storage system and partially stored in a locally maintained data storage system.

In one embodiment, the recovery computing entity 20 may further include or be in communication with volatile media (also referred to as volatile storage, memory, memory storage, memory circuitry and/or similar terms used herein interchangeably). In one embodiment, the volatile storage or memory may also include one or more volatile storage or memory media 207 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 308. Thus, the databases, database instances, database management system entities, data, applications, programs, program modules, scripts, source code, object code, byte code, compiled code, interpreted code, machine code, executable instructions, and/or the like may be used to control certain aspects of the operation of the recovery computing entity 20 with the assistance of the processing element 205 and operating system.

As indicated, in one embodiment, the recovery computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. For instance, the recovery computing entity 20 may communicate with computing entities or communication interfaces of other computing systems, client computing entities 30, and/or the like.

As indicated, in one embodiment, the recovery computing entity 20 may also include one or more network and/or communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the recovery computing entity 20 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra wideband (UWB), infrared (IR) protocols, near field communication (NFC) protocols, Wibree, Bluetooth protocols, wireless universal serial bus (USB) protocols, and/or any other wireless protocol. The recovery computing entity 20 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

As will be appreciated, one or more of the recovery computing entity's 20 components may be located remotely from other computing system components, such as in a distributed system. Furthermore, one or more of the components may be aggregated and additional components performing functions described herein may be included in the recovery computing entity 20. Thus, the recovery computing entity 20 can be adapted to accommodate a variety of needs and circumstances.

b. Exemplary Client Computing Entity

Figure 11:
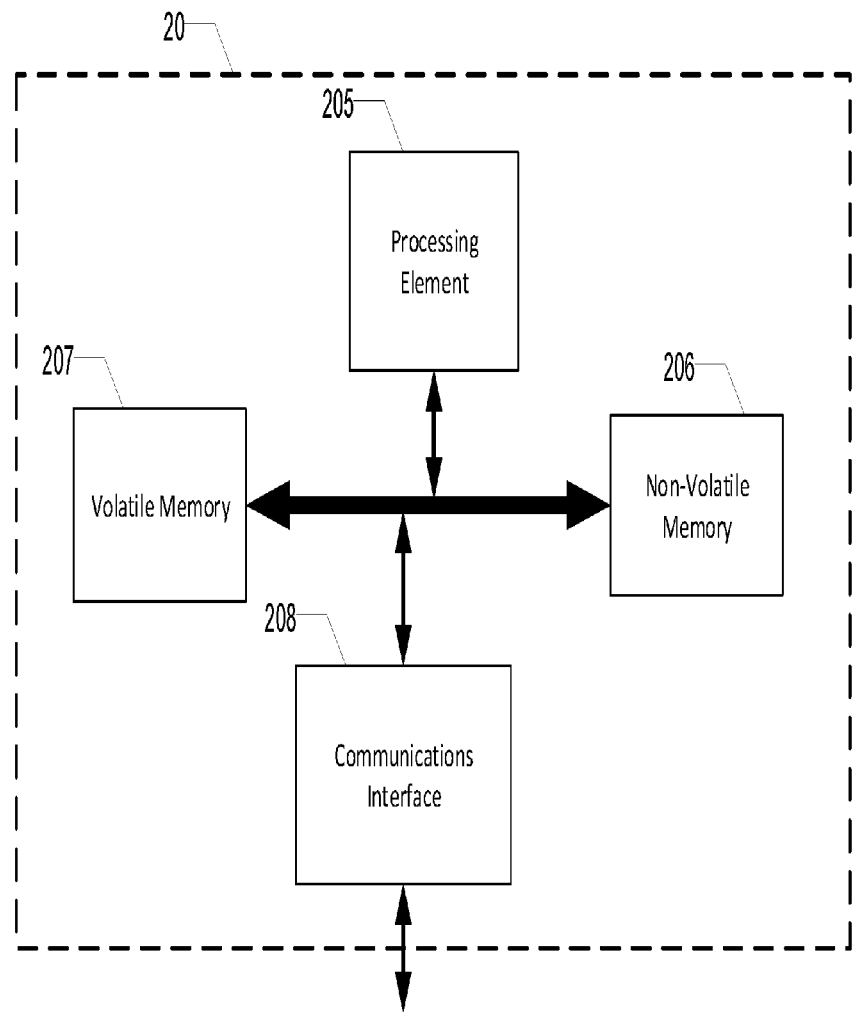
FIG. 11 shows a schematic diagram of a recovery computing entity according to one embodiment.
Figure 12:
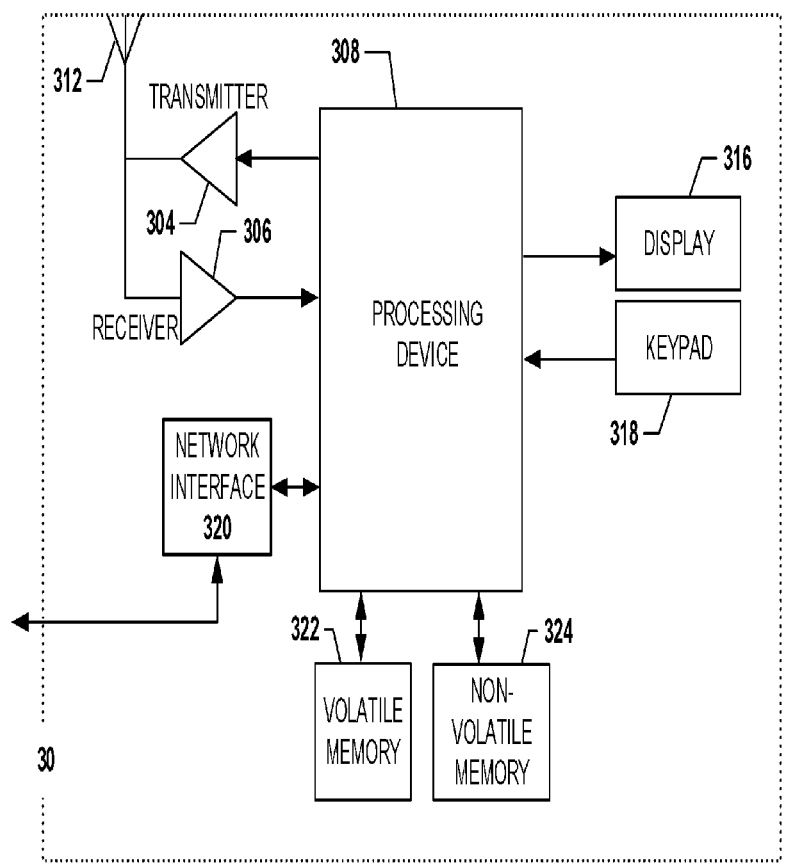
FIG. 12 shows a schematic diagram of a client computing entity according to one embodiment.

FIG. 11 provides an illustrative schematic representative of client computing entity 30 that can be used in conjunction with embodiments of the present invention. In certain embodiments, client computing entities 30 may be mobile computing devices, such as smartphones, tablets, laptops, and/or the like. In other embodiments, the client computing entities 30 may have a configuration similar to the recovery computing entity 20 discussed above (e.g., encompassing non-portable computing entities, such as desktop computers, cloud-based computing systems, server systems, and/or the like, which may be configured for executing one or more virtual machines, accessible via terminals). As shown in FIG. 11, a client computing entity 30 can include an antenna 312, a transmitter 304 (e.g., radio), a receiver 306 (e.g., radio), and a processing element 308 that provides signals to and receives signals from the transmitter 304 and receiver 306, respectively. The signals provided to and received from the transmitter 304 and the receiver 306, respectively, may include signaling information/data in accordance with an air interface standard of applicable wireless systems to communicate with various entities, such as a recovery computing 20, another client computing entity 30, and/or the like. In this regard, the client computing entity 30 may be capable of operating with one or more air interface standards, communication protocols, modulation types, and access types. More particularly, the client computing entity 30 may operate in accordance with any of a number of wireless communication standards and protocols.

Via these communication standards and protocols, the client computing entity 30 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The client computing entity 30 can also download changes, add-ons, and updates, for instance, to its firmware, software (e.g., including executable instructions, applications, program modules), and operating system.

According to one embodiment, the client computing entity 30 may include location determining aspects, devices, modules, functionalities, and/or similar words used herein interchangeably. For example, the client computing entity 30 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the client computing entity's 30 position in connection with a variety of other systems, including cellular towers, Wi-Fi access points, and/or the like. Similarly, the client computing entity 30 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing entities (e.g., smartphones, laptops) and/or the like. For instance, such technologies may include iBeacons, Gimbal proximity beacons, BLE transmitters, Near Field Communication (NFC) transmitters, and/or the like. These indoor positioning aspects can be used in a variety of settings to determine the location of someone or something to within inches or centimeters.

The client computing entity 30 may also comprise a user interface device comprising one or more user input/output interfaces (e.g., a display 316 and/or speaker/speaker driver coupled to a processing element 308 and a touch screen, keyboard, mouse, and/or microphone coupled to a processing element 308). For example, the user output interface may be configured to provide an application, browser, user interface, dashboard, webpage, and/or similar words used herein interchangeably executing on and/or accessible via the client computing entity 30 to cause display or audible presentation of information/data and for user interaction therewith via one or more user input interfaces. The user input interface can comprise any of a number of devices allowing the client computing entity 30 to receive data, such as a keypad 318 (hard or soft), a touch display, voice/speech or motion interfaces, scanners, readers, or other input device. In embodiments including a keypad 318, the keypad 318 can include (or cause display of) the conventional numeric (0-9) and related keys (#, *), and other keys used for operating the client computing entity 30 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the client computing entity 30 can collect information/data, user interaction/input, and/or the like.

The client computing entity 30 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the client computing entity 30.

c. Exemplary Networks

In one embodiment, any two or more of the illustrative components of the architecture of FIG. 9 may be configured to communicate with one another via respective communicative couplings to one or more networks 35. The networks 35 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 35 may have any suitable communication range associated therewith and may include, for example, global networks (e.g., the Internet), MANs, WANs, LANs, or PANs. In addition, the networks 35 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

V. CONCLUSION

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A data recovery system for protecting data generated and stored in primary storage in association with a protected site, the data recovery system comprising:
    one or more non-transitory memory storage areas and one or more processors configured for execution as either an object-based data store or a filesystem storage environment, and wherein:
    when executing as an object-based data store, storing data of one or more protected sites for recovery in the object-based data store by:
        receiving data replicated from the one or more protected sites while the data is written to the primary storage of the one or more protected sites; and
        storing the data received from the one or more protected sites in object-based storage within the one or more non-transitory memory storage areas to enable point-in-time recovery; and
        executing garbage collection to re-write valid data identified within one or more data objects subject to deletion during garbage collection at least in part by receiving the valid data from the primary storage of the one or more protected sites and re-writing the valid data received from the primary storage of the one or more protected sites as one or more new data objects stored at the non-transitory memory storage area,
    when executing as a filesystem storage environment, storing data of the one or more protected sites in a filesystem storage environment for immediate access by systems for data input-output operations by:
        receiving data replicated from the one or more protected sites while the data is written to the primary storage of the one or more protected sites in real time during data input-output operations of the systems for data input-output operations;
        storing the data received from the one or more protected sites in storage within the one or more non-transitory memory storage areas accessible to the systems for data input-output operations to enable at least substantially immediate recovery of the data of a protected site of the one or more protected sites; and
        during a recovery operation, providing the data stored within the one or more non-transitory memory storage areas to at least one system for data input-output operations to enable recovery of data associated with a protected site of the one or more protected sites.

2. The data recovery system of claim 1, wherein the object-based data store is configured for point-in-time-based recovery to provide, during a recovery operation executed at least in part via the object-based data store, data to restore virtual machines to a data state reflecting a point in time.

3. The data recovery system of claim 1, wherein the object-based data store is configured to store the data received from the one or more protected sites as version-based data objects configured for version-based recovery operations.

4. The data recovery system of claim 1, wherein the one or more protected sites each comprise a plurality of virtual machines.

5. The data recovery system of claim 1, wherein the filesystem storage environment is configured to, when receiving data replicated from the one or more protected sites, receive data from a replication log executing via a processing system of a protected site of the one or more protected sites.

6. The data recovery system of claim 1, wherein the object-based data store is configured to, when receiving data replicated from the one or more protected sites, receive data from a replication log executing via a processing system of a protected site of the one or more protected sites.

7. The data recovery system of claim 1, wherein storing the data received from the one or more protected sites in object-based storage comprises storing the data together with corresponding metadata uniquely identifying each data object to enable point-in-time recovery.

8. A method for protecting data generated and stored in primary storage at a protected site and enabling data recovery, the method comprising:
    executing, via one or more processors and one or more memory storage areas, a data recovery system for protecting data generated and stored in primary storage in association with a protected site, wherein the data recovery system is configured for storing data replicated from one or more protected sites in one of an object-based data store or a filesystem storage environment;
    wherein storing data in the object-based data store comprises:
        receiving data replicated from one or more protected sites while the data is written to primary storage of the one or more protected sites in real time during data input-output operations of the systems for data input-output operations; and storing the data received from the one or more protected sites in the object-based data store to enable point-in-time recovery; and executing garbage collection to re-write valid data identified within one or more data objects subject to deletion during garbage collection at least in part by receiving the valid data from the primary storage of the one or more protected sites and re-writing the valid data received from the primary storage of the one or more protected sites as one or more new data objects stored at the non-transitory memory storage area; and wherein storing data in the filesystem storage environment comprises:

receiving data replicated from the one or more protected sites while the data is written to primary storage of the one or more protected sites in real time during data input-output operations of the systems for data input-output operations, wherein the filesystem storage environment is immediately accessible by systems for data input-output operations;

storing the data received from the one or more protected sites in the filesystem storage environment accessible to the systems for data input-output operations to enable at least substantially immediate recovery of the data of a protected site of the one or more protected sites; and during a recovery operation, providing the data stored within the filesystem storage environment to at least one system for data input-output operations to enable recovery of data associated with a protected site of the one or more protected sites.

9. The method of claim 8, wherein storing the data in the object-based data store comprises storing the data to enable point-in-time-based recovery to provide, during a recovery operation executed at least in part via the object-based data store, data to restore virtual machines to a data state reflecting a point in time.

10. The method of claim 8, wherein storing the data in the object-based data store comprises storing the data received from the one or more protected sites as version-based data objects configured for version-based recovery operations.

11. The method of claim 8, wherein storing the data in the filesystem storage environment comprises, when receiving data replicated from the one or more protected sites, receiving data from a replication log executing via a processing system of a protected site of the one or more protected sites.

12. The method of claim 8, wherein storing the data in the object-based data store comprises, when receiving data replicated from the one or more protected sites, receiving data from a replication log executing via a processing system of a protected site of the one or more protected sites.

13. The method of claim 8, wherein storing the data received from the one or more protected sites in object-based storage comprises storing the data together with corresponding metadata uniquely identifying each data object to enable point-in-time recovery.

14. A computer-program product for protecting data generated and stored in primary storage at a protected site and enabling data recovery, the computer-program product comprising at least one non-transitory computer-readable storage medium having computer-readable program code portions stored therein, the computer-readable program code portions comprising:

a first executable portion configured for storing data of one or more protected sites for recovery in an object-based data store; and a second executable portion, executable in the alternative with the first executable portion, configured for storing data of the one or more protected sites in a filesystem storage environment for immediate access by systems for data input-output operations; and wherein execution of the executable portion configured for storing data of the one or more protected sites for recovery in the object-based data store comprises:

receiving data replicated from the one or more protected sites while the data is written to primary storage of the one or more protected sites in real time during data input-output operations of the systems for data input-output operations; and storing the data received from the one or more protected sites in the object-based data store to enable point-in-time recovery; and executing garbage collection in the object-based data store to re-write valid data identified within one or more data objects subject to deletion during garbage collection at least in part by receiving the valid data from primary storage of the one or more protected sites and re-writing the valid data received from primary storage of the one or more protected sites as one or more new data objects stored at the one or more non-transitory memory storage area; and wherein execution of the executable portion configured for storing data of the one or more protected sites in a filesystem storage environment comprises:

receiving data replicated from the one or more protected sites while the data is written to primary storage of the one or more protected sites in real time during data input-output operations of the systems for data input-output operations, wherein the filesystem storage environment is immediately accessible by systems for data input-output operations;

storing the data received from the one or more protected sites in the filesystem storage environment accessible to the systems for data input-output operations to enable at least substantially immediate recovery of the data of a protected site of the one or more protected sites; and during a recovery operation, providing the data stored within the filesystem storage environment to at least one system for data input-output operations to enable recovery of data associated with a protected site of the one or more protected sites.

15. The computer-program product of claim 14, wherein storing the data in the filesystem storage environment comprises, when receiving data replicated from the one or more protected sites, receiving data from a replication log executing via a processing system of a protected site of the one or more protected sites.

16. The computer-program product of claim 14, wherein storing the data in the object-based data store comprises, when receiving data replicated from the one or more protected sites, receiving data from a replication log executing via a processing system of a protected site of the one or more protected sites.

17. The computer-program product of claim 14, wherein storing the data received from the one or more protected sites in object-based storage comprises storing the data together with corresponding metadata uniquely identifying each data object to enable point-in-time recovery.

* * * * *